US012705889B2

(12) United States Patent
Zhang

(10) Patent No.: US 12,705,889 B2
(45) Date of Patent: Aug. 11, 2026

(54) COMPUTER SYSTEM FOR DETECTING A TOOL LOCATION IN SURGICAL VIDEO FRAME BY GENERATING GAUSSIAN POINT ON THE TOOL LOCATION AND PREDICTING SURGICAL ACTIONS

(71) Applicant: CSATS, Inc., Seattle, WA (US)

(72) Inventor: Bokai Zhang, Seattle, WA (US)

(73) Assignee: CSATS, Inc., Seattle, WA (US)

( * ) Notice: Subject to any disclaimer, the term of this patent is extended or adjusted under 35 U.S.C. 154(b) by 328 days.

(21) Appl. No.: 17/947,041

(22) Filed: Sep. 16, 2022

(65) Prior Publication Data

US 2023/0017202 A1 Jan. 19, 2023

Related U.S. Application Data

(63) Continuation-in-part of application No. PCT/IB2022/053473, filed on Apr. 13, 2022.

(Continued)

(51) Int. Cl.
*G06V 20/40* (2022.01)
*G06T 7/73* (2017.01)

(Continued)

(52) U.S. Cl.
CPC ................ *G06V 20/41* (2022.01); *G06T 7/73* (2017.01); *G06V 10/225* (2022.01); *G06V 10/25* (2022.01); *G06V 10/7715* (2022.01); *G06V 10/82* (2022.01); *G06V 20/46* (2022.01); *G06V 20/50* (2022.01); *G06T 2207/10016* (2013.01);

(Continued)

(58) Field of Classification Search
None
See application file for complete search history.

(56) References Cited

U.S. PATENT DOCUMENTS 10,016,142 B2 * 7/2018 Block ................. A61B 5/6847
2008/0140385 A1 6/2008 Mahajan et al.

(Continued)

FOREIGN PATENT DOCUMENTS

KR 101994592 B1 6/2019

OTHER PUBLICATIONS

Khurana et al., "Video Question-Answering Techniques, Benchmark Datasets and Evaluation Metrics Leveraging Video Captioning: A Comprehensive Survey", IEEE Access, IEEE, USA, vol. 9, Feb. 9, 2021, pp. 43799-43823.

(Continued)

*Primary Examiner* — Haris Sabah
(74) *Attorney, Agent, or Firm* — Condo Roccia Koptiw LLP

(57) ABSTRACT

Systems, methods, and instrumentalities are disclosed for computer vision-based surgical workflow recognition using natural language processing (NLP) techniques. Surgical video of surgical procedures may be processed and analyzed, for example, to achieve workflow recognition. Surgical phases may be determined based on the surgical video and segmented to generate an annotated video representation. The annotated video representation of the surgical video may provide information associated with the surgical procedure. For example, the annotated video representation may provide information on surgical phases, surgical events, surgical tool usage, and/or the like.

18 Claims, 18 Drawing Sheets

Related U.S. Application Data

(60) Provisional application No. 63/174,820, filed on Apr. 14, 2021, provisional application No. 63/245,049, filed on Sep. 16, 2021.

(51) Int. Cl.

| | |
|---|---|
| ***G06V 10/22*** | (2022.01) |
| ***G06V 10/25*** | (2022.01) |
| ***G06V 10/77*** | (2022.01) |
| ***G06V 10/82*** | (2022.01) |
| ***G06V 20/50*** | (2022.01) |

(52) U.S. Cl.

CPC ............... *G06T 2207/20084* (2013.01); *G06T 2207/30004* (2013.01); *G06V 2201/034* (2022.01)

(56) References Cited

U.S. PATENT DOCUMENTS

| | | | | |
|---|---|---|---|---|
| 2011/0243403 | A1* | 10/2011 | Mizuno | G06T 7/0012 382/128 |
| 2013/0191415 | A1 | 7/2013 | Ambwani et al. | |
| 2014/0148690 | A1* | 5/2014 | Kim | A61B 6/12 600/407 |
| 2016/0110890 | A1* | 4/2016 | Smith | G06T 11/10 382/128 |
| 2017/0132190 | A1 | 5/2017 | Koutrika et al. | |
| 2018/0085023 | A1* | 3/2018 | Tillander | G01R 33/4804 |
| 2018/0200002 | A1* | 7/2018 | Kostrzewski | G02C 7/049 |
| 2018/0365497 | A1* | 12/2018 | Balasundaram | G06T 5/70 |
| 2019/0110856 | A1 | 4/2019 | Barral et al. | |
| 2019/0362834 | A1* | 11/2019 | Venkataraman | G06V 20/41 |
| 2020/0125600 | A1 | 4/2020 | Jo | |
| 2020/0268457 | A1 | 8/2020 | Wolf et al. | |
| 2020/0273581 | A1* | 8/2020 | Wolf | G16H 40/63 |
| 2021/0398304 | A1* | 12/2021 | Uyama | A61B 1/00194 |

OTHER PUBLICATIONS

Sun et al., “VideoBERT: A Joint Model for Video and Language Representation Learning”, IEEE/CVF International Conference on Computer Vision (ICCV), IEEE, Oct. 27, 2019, pp. 7463-7472.

* cited by examiner

COMPUTER SYSTEM FOR DETECTING A TOOL LOCATION IN SURGICAL VIDEO FRAME BY GENERATING GAUSSIAN POINT ON THE TOOL LOCATION AND PREDICTING SURGICAL ACTIONS

CROSS-REFERENCE TO RELATED APPLICATIONS

This application is a continuation in part of Patent Cooperation Treaty Application No. PCT/IB2022/053473, filed Apr. 13, 2022, which claims the benefit of U.S. Provisional Application No. 63/174,820, filed Apr. 14, 2021, the contents of which are incorporated by reference in their entirety herein; and this application claims the benefit of U.S. Provisional Application No. 63/245,049, filed Sep. 16, 2021, the contents of which are incorporated by reference in their entirety herein.

BACKGROUND

Recorded surgical procedures may contain valuable information for medical education and/or medical training purposes. The recorded surgical procedures may be analyzed to determine efficiency, quality, and outcome metrics associated with the surgical procedure. However, surgical videos are long videos. For example, surgical videos can include a whole surgical procedure consisting of multiple surgical phases. The length of the surgical videos and the number of surgical phases may present difficulties for surgical workflow recognition.

SUMMARY

Systems, methods, and instrumentalities are disclosed for computer vision-based surgical workflow recognition using natural language processing (NLP) techniques. Surgical video of surgical procedures may be processed and analyzed, for example, to achieve workflow recognition. Surgical phases may be determined based on the surgical video and segmented to generate an annotated video representation. The annotated video representation of the surgical video may provide information associated with the surgical procedure. For example, the annotated video representation may provide information on surgical phases, surgical events, surgical tool usage, and/or the like.

A computing system may use NLP techniques to generate a prediction result associated with a surgical video. The prediction result may correspond with a surgical workflow. For example, the computing system may obtain surgical video data. The surgical video data may be obtained, for example, from a surgical device, such as a surgical computing system, a surgical hub, a surgical-site camera, a surgical surveillance system, and/or the like. The surgical video data may include images. The computing system may perform NLP techniques on the surgical video, for example, to associate the images with surgical activities. The surgical activities may indicate a surgical phase, a surgical task, a surgical step, an idle period, a usage of a surgical tool, and/or the like. The computing system may generate a prediction result, for example, based on the performed NLP techniques. The prediction result may be configured to indicate information associated with the surgical activities in the surgical video data. For example, the prediction result may be configured to indicate a start time and an end time of the surgical activities in the surgical video data. The prediction result may be generated as an annotated surgical video and/or metadata associated with the surgical video.

For example, the performed NLP techniques may include extracting a representation summary of the surgical video data. The computing system may use NLP techniques to extract a representation summary of the surgical video data, for example, using a transformer network. The computing system may use NLP techniques to extract a representation summary of the surgical video data, for example, using a three-dimensional convolutional neural network (3D CNN) and a transformer network (e.g., which may be referred to as a hybrid network).

For example, the performed NLP techniques may include extracting a representation summary of the surgical video using NLP techniques, generating a vector representation based on the extracted representation summary, and determining (e.g., based on the generated vector representation), a predicted grouping of video segments using natural language processing. The performed NLP techniques may include filtering the predicted grouping of video segments, for example, using a transformer network.

For example, the computing system may use NLP techniques to identify a phase boundary associated with the surgical activities. The phase boundary may indicate a boundary between surgical phases. The computing system may generate an output based on the identified phase boundary. For example, the output may indicate each surgical phase's start time and end time.

For example, the computing system may use NLP techniques to identify a surgical event (e.g., an idle period) associated with the surgical video. The idle period may be associated with inactivity during the surgical procedure. The computing system may generate an output based on the idle periods. For example, the output may indicate an idle start time and an idle end time. The computing system may refine the prediction result, for example, based on the identified idle period. The computing system may generate a surgical procedure improvement recommendation, for example, based on the identified idle period.

For example, the computing system may use NLP techniques to detect a surgical tool in the video data. The computing system may generate a prediction result based on the detected surgical tool. The prediction result may be configured to indicate a start time and an end time associated with the surgical tool usage during the surgical procedure.

The computing system may use NLP techniques to generate the annotated video representation of the surgical video (e.g., achieve surgical workflow recognition). For example, the computing system may use an artificial intelligence (AI) model to achieve surgical workflow recognition. For example, the computing system may receive the surgical video, where the surgical video may be associated with a previously recorded surgical procedure or a live surgical procedure. For example, the computing system may receive video data for a live surgical procedure from a surgical hub and/or surgical surveillance system. The computing system may perform NLP techniques on the surgical video. The computing system may determine one or more phases associated with the surgical video, such as, for example, surgical phases. The computing system may determine a prediction result, for example, based on the NLP techniques processing. The prediction result may include information associated with the surgical video, for example, such as information on surgical phases, surgical events, surgical tool usage, and/or the like. The computing system may send the prediction result to a storage and/or a user.

The computing system may use NLP techniques, for example, to extract a representation summary based on the video data. The representation summary may include detected features associated with the video data. The detected features may be used to indicate surgical phases, surgical events, surgical tools, and/or the like. The computing system may use NLP techniques, for example, to generate a vector representation based on the extracted representation summary. The computing system may use NLP techniques, for example, the determine a predicted grouping of video segments (e.g., based on the generated vector representation). The predicted grouping of video segments, for example, may be a grouping of video segments associated with the same surgical phase, surgical event, surgical tool, and/or the like. The computing system may use NLP techniques, for example, to filter the predicted grouping of video segments. The computing system may use NLP techniques to determine a phase boundary between predicted surgical workflow phases. For example, the computing system may determine a transition period between surgical phases. The computing system may use NLP techniques to determine an idle period, for example, where the idle period is associated with inactivity during the surgical procedure.

In examples, the computing system may use neural networks with the AI model to determine workflow recognition. The neural networks may include convolutional neural networks (CNNs), transformer networks, and/or hybrid networks.

DETAILED DESCRIPTION

Figure 1:
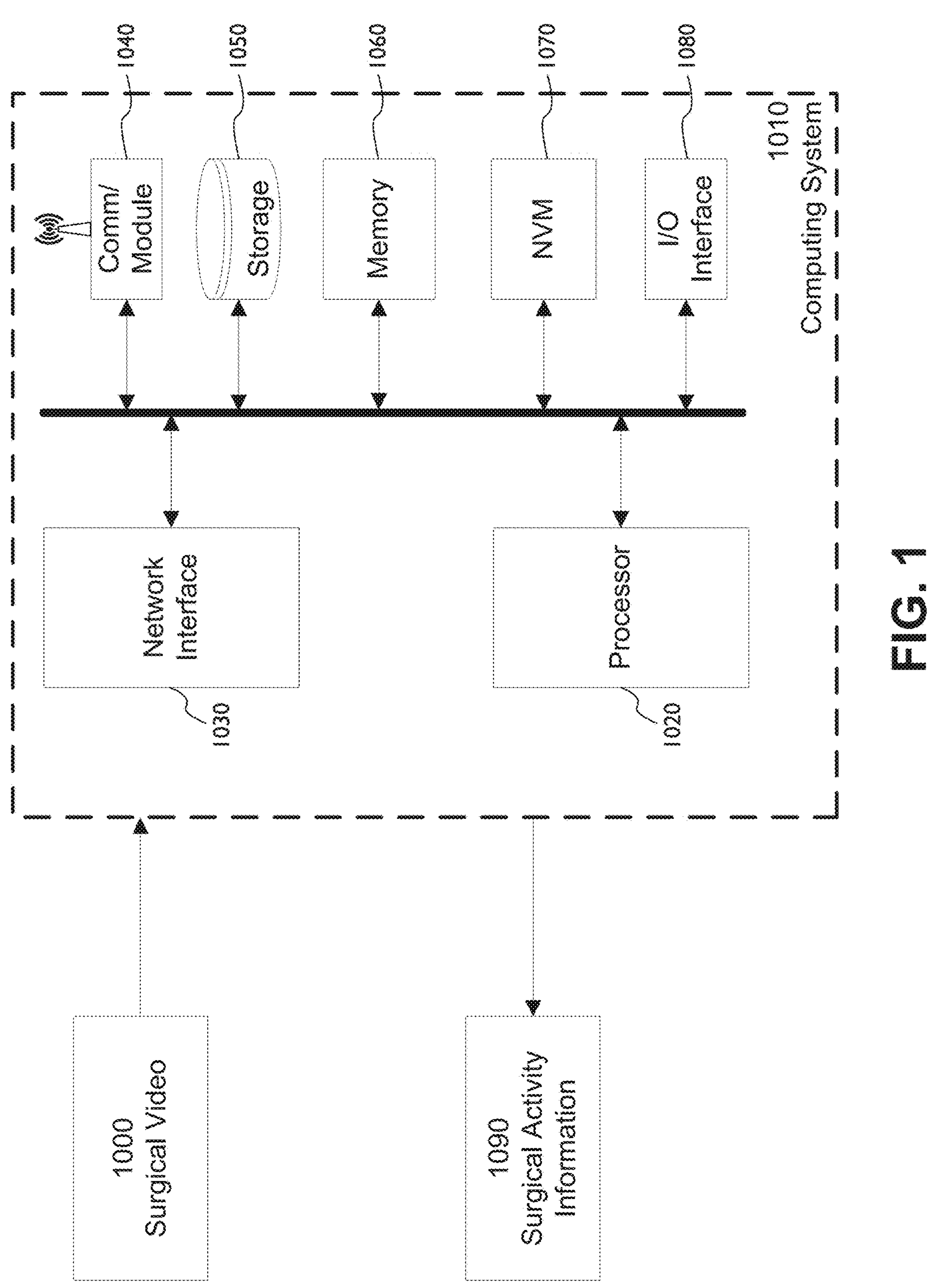
FIG. 1 illustrates an example computing system for determining information associated with a surgical procedure video and generating an annotated surgical video.

Recorded surgical procedures may contain valuable information for medical education and/or medical training. Information derived from recorded surgical procedures may be helpful in determining efficiency, quality, and outcome metrics associated with the surgical procedure. For example, the recorded surgical procedures may give insight to a surgical team's skills and actions in a surgical procedure. The recorded surgical procedure may allow for training, for example, by identifying areas of improvement in the surgical procedure. For example, avoidable idle periods may be identified in a recorded surgical procedure, which may be used for training purposes.

Many surgical procedures have been recorded and may be analyzed as a collection, for example, to determine information and/or features associated with the surgery such that the information may be used to improve surgical tactics and/or surgical procedures. Surgical procedures may be analyzed to determine feedback and/or metrics associated with the performance of the surgical procedure. For example, information from a recorded surgical procedure may be used to analyze a live surgical procedure. The information from the recorded surgical procedure may be used to guide or instruct the OR team performing a live surgical procedure.

The surgical procedure may involve surgical phases, steps, and/or tasks, for example, that may be analyzed. As surgical procedures are generally long, recorded surgical procedures can be long videos. Parsing through a long recorded surgical procedure to determine surgical information for training purposes and surgical improvement may be difficult. The surgical procedure may be divided into surgical phases, steps, and/or tasks, for example, for analysis. The shorter segments may allow for easier analysis. The shorter segments of the surgical procedure may allow for comparison between the same or similar surgical phases of different recorded surgical procedures. Segmenting the surgical procedure into surgical phases may allow for more detailed analysis of particular surgical steps and/or tasks for surgical procedures. For example, a sleeve gastronomy procedure may be segmented into surgical phases, such as a gastric transection phase. A gastric transection phase of a first sleeve gastronomy procedure may be compared with a gastric transection phase of a second sleeve gastronomy procedure. The information from the gastric transection phase may be used to improve surgical techniques for the gastric transection phase, and/or provide medical instructions for future gastric transection phases.

Surgical procedures may be segmented into surgical phases, for example. For example, surgical phases may be analyzed to determine particular surgical events, surgical tool usage, and/or idle periods that may occur during a surgical phase. The surgical events may be identified to determine trends in the surgical phase. The surgical events may be used to determine areas of improvement for the surgical phase.

In examples, idle periods during a surgical phase may be identified. Idle periods may be identified to determine portions of a surgical phase that may be improved. For example, an idle period may be detected at a similar time during a particular surgical phase across different surgical procedures. The idle period may be identified and determined to be a result of a surgical tool exchange. The idle period may be reduced, for example, by preparing the surgical tool exchange ahead of time. Preparing the surgical tool exchange ahead of time may eliminate the idle period and allow for a shortened surgical procedure by reducing the downtime.

In examples, transition periods between surgical phases (e.g., surgical phase boundaries) may be identified. The transition periods may be signified by a change in surgical tools or a change in OR staff, for example. The transition periods may be analyzed to determine areas of improvement for the surgical procedure.

Video-based surgical workflow recognition may be performed at computer-assisted interventional systems, for example, for operating rooms. Computer-assisted interventional systems may enhance coordination among OR teams and/or improve surgical safety. Computer-assisted interventional systems may be used for online (e.g., real-time, live feed) and/or offline surgical workflow recognition. For example, offline surgical workflow recognition may include performing surgical workflow recognition on previously recorded videos of surgical procedures. Offline surgical workflow recognition may provide a tool to automate indexing of surgical video databases and/or provide support in video-based assessment (VBA) systems to surgeons for learning and educational purposes.

A computing system may be used to analyze the surgical procedures. The computing system may derive surgical information and/or features from recorded surgical procedures. The computing system may receive surgical videos, for example, from a storage of surgical videos, a surgical hub, a surveillance system in an OR, and/or the like. The computing system may process the surgical videos, for example, by extracting features and/or determining information from the surgical video. The extracted features and/or information may be used to identify workflow of the surgical procedure, such as surgical phases, for example. The computing system may segment recorded surgical videos, for example, into video segments corresponding to different surgical phases associated with the surgical procedure. The computing system may determine transitions between the surgical phases in the surgical video. The computing system may determine idle periods and/or surgical tool usage, for example, in the surgical phases and/or segmented recorded surgical video. The computing system may generate the surgical information derived from the recorded surgical procedure, such as the surgical phase segmentation information. For example, the derived surgical information may be sent to a storage for future use, such as for medical education and/or instruction.

In examples, the computing system may use image processing to derive information from the recorded surgical videos. The computing system may use image processing and/or image/video classification on the frames of the recorded surgical videos. The computing system, based on the image processing, may determine surgical phases for the surgical procedure. The computing system, based on the image processing, determine information that may identify surgical events and/or surgical phase transitions.

The computing system may include a model artificial intelligence (AI) system, for example, to analyze recorded surgical procedures and determine information associated with the recorded surgical procedure. The model AI system may, for example, derive the performance metrics associated with the surgical procedures based on information derived from the recorded surgical procedure. The model AI system may use image processing and/or image/video classification to determine the surgical procedure information, for example, such as surgical phase, surgical phase transitions, surgical events, surgical tool usage, idle periods, and/or the like. The computing system may train the model AI system, for example, using machine learning. The computing system may use the trained model AI system to achieve surgical workflow recognition, surgical event recognition, surgical tool detection, and/or the like.

The computing system may use image/video classification networks, for example, to capture spatial information from surgical videos. The computing system may capture spatial information from the surgical videos on a frame-by-frame basis, for example, to achieve surgical workflow recognition.

Machine learning may be supervised (e.g., supervised learning). A supervised learning algorithm may create a mathematical model from training a dataset (e.g., training data). The training data may consist of a set of training examples. A training example may include one or more inputs and one or more labeled outputs. The labeled output(s) may serve as supervisory feedback. In a mathematical model, a training example may be represented by an array or vector, sometimes called a feature vector. The training data may be represented by row(s) of feature vectors, constituting a matrix. Through iterative optimization of an objective function (e.g., cost function), a supervised learning algorithm may learn a function (e.g., a prediction function) that may be used to predict the output associated with one or more new inputs. A suitably trained prediction function may determine the output for one or more inputs that may not have been a part of the training data. Example algorithms may include linear regression, logistic regression, and neutral network. Example problems solvable by supervised learning algorithms may include classification, regression problems, and the like.

Machine learning may be unsupervised (e.g., unsupervised learning). An unsupervised learning algorithm may train on a dataset that may contain inputs and may find a structure in the data. The structure in the data may be similar to a grouping or clustering of data points. As such, the algorithm may learn from training data that may not have been labeled. Instead of responding to supervisory feedback, an unsupervised learning algorithm may identify commonalities in training data and may react based on the presence or absence of such commonalities in each training example. Example algorithms may include Apriori algorithm, K-Means, K-Nearest Neighbors (KNN), K-Medians, and the like. Example problems solvable by unsupervised learning algorithms may include clustering problems, anomaly/outlier detection problems, and the like.

Machine learning may include reinforcement learning, which may be an area of machine learning that may be concerned with how software agents may take actions in an environment to maximize a notion of cumulative reward. Reinforcement learning algorithms may not assume knowledge of an exact mathematical model of the environment (e.g., represented by Markov decision process (MDP)) and may be used when exact models may not be feasible.

Machine learning may be a part of a technology platform called cognitive computing (CC), which may constitute various disciplines such as computer science and cognitive science. CC systems may be capable of learning at scale, reasoning with purpose, and interacting with humans naturally. By means of self-teaching algorithms that may use data mining, visual recognition, and/or natural language processing, a CC system may be capable of solving problems and optimizing human processes.

The output of machine leanings training process may be a model for predicting outcome(s) on a new dataset. For example, a linear regression learning algorithm may be a cost function that may minimize the prediction errors of a linear prediction function during the training process by adjusting the coefficients and constants of the linear prediction function. When a minimal may be reached, the linear prediction function with adjusted coefficients may be deemed trained and constitute the model the training process has produced. For example, a neural network (NN) algorithm (e.g., multilayer perceptrons (MLP)) for classification may include a hypothesis function represented by a network of layers of nodes that are assigned with biases and interconnected with weight connections. The hypothesis function may be a non-linear function (e.g., a highly non-linear function) that may include linear functions and logistic functions nested together with the outermost layer consisting of one or more logistic functions. The NN algorithm may include a cost function to minimize classification errors by adjusting the biases and weights through a process of feedforward propagation and backward propagation. When a global minimum may be reached, the optimized hypothesis function with its layers of adjusted biases and weights may be deemed trained and constitute the model the training process has produced.

Data collection may be performed for machine learning as a stage of the machine learning lifecycle. Data collection may include steps such as identifying various data sources, collecting data from the data sources, integrating the data, and the like. For example, for training a machine learning model for predicting surgical phases, surgical events, idle periods, surgical tool usage may be identified. Such data sources may be a surgical video associated with a surgical procedure, such as a previously recorded surgical procedure or a live surgical procedure captured by a surgical surveillance system, and/or the like. The data from such data sources may be retrieved and stored in a central location for further processing in the machine learning lifecycle. The data from such data sources may be linked (e.g. logically linked) and may be accessed as if they were centrally stored. Surgical data and/or post-surgical data may be similarly identified and/or collected. Further, the collected data may be integrated.

Data preparation may be performed for machine learning as another stage of the machine learning lifecycle. Data preparation may include data preprocessing steps such as data formatting, data cleaning, and data sampling. For example, the collected data may not be in a data format suitable for training a model. In an example, the data may be in a video format. Such data record may be converted for model training. Such data may be mapped to numeric values for model training. For example, the surgical video data may include personal identifier information or other information that may identifier a patient such as an age, an employer, a body mass index (BMI), demographic information, and the like. Such identifying data may be removed before model training. For example, identifying data may be removed for privacy reasons. As another example, data may be removed because there may be more data available than may be used for model training. In such case, a subset of the available data may be randomly sampled and selected for model training and the remainder may be discarded.

Data preparation may include data transforming procedures (e.g., after preprocessing), such as scaling and aggregation. For example, the preprocessed data may include data values in a mixture of scales. These values may be scaled up or down, for example, to be between 0 and 1 for model training. For example, the preprocessed data may include data values that carry more meaning when aggregated.

Model training may be another aspect of the machine learning lifecycle. The model training process as described herein may be dependent on the machine learning algorithm used. A model may be deemed suitably trained after it has been trained, cross validated, and tested. Accordingly, the dataset from the data preparation stage (e.g., an input dataset) may be divided into a training dataset (e.g., 60% of the input dataset), a validation dataset (e.g., 20% of the input dataset), and a test dataset (e.g., 20% of the input dataset). After the model has been trained on the training dataset, the model may be run against the validation dataset to reduce overfitting. If accuracy of the model were to decrease when run against the validation dataset when accuracy of the model has been increasing, this may indicate a problem of overfitting. The test dataset may be used to test the accuracy of the final model to determine whether it is ready for deployment or more training may be required.

Model deployment may be another aspect of the machine learning lifecycle. The model may be deployed as a part of a standalone computer program. The model may be deployed as a part of a larger computing system. A model may be deployed with model performance parameters(s). Such performance parameters may monitor the model accuracy as it is used for predicating on a dataset in production. For example, such parameters may keep track of false positives and false positives for a classification model. Such parameters may further store the false positives and false positives for further processing to improve the model's accuracy.

Post-deployment model updates may be another aspect of the machine learning cycle. For example, a deployed model may be updated as false positives and/or false negatives are predicted on production data. In an example, for a deployed MLP model for classification, as false positives occur, the deployed MLP model may be updated to increase the probability cutoff for predicting a positive to reduce false positives. In an example, for a deployed MLP model for classification, as false negatives occur, the deployed MLP model may be updated to decrease the probability cutoff for predicting a positive to reduce false negatives. In an example, for a deployed MLP model for classification of surgical complications, as both false positives and false negatives occur, the deployed MLP model may be updated to decrease the probability cutoff for predicting a positive to reduce false negatives because it may be less critical to predict a false positive than a false negative.

For example, a deployed model may be updated as more live production data become available as training data. In such case, the deployed model may be further trained, validated, and tested with such additional live production data. In an example, the updated biases and weights of a further-trained MLP model may update the deployed MLP model's biases and weights. Those skilled in the art recognize that post-deployment model updates may not be a one-time occurrence and may occur as frequently as suitable for improving the deployed model's accuracy.

FIG. 1 illustrates an example computing system for determining information associated with a surgical procedure video and generating an annotated surgical video. As shown in FIG. 1, a surgical video 1000 may be received by a computing system 1010. The computing system 1010 may perform processing (e.g., image processing) on the surgical video. The computing system 1010 may determine features and/or information associated with the surgical video based on the performed processing. For example, the computing system 1010 may determine features and/or information such as surgical phases, surgical phase transitions, surgical events, surgical tool usage, idle periods, and/or the like. The computing system 1010 may segment the surgical phases, for example, based on the extracted features and/or information from the processing. The computing system 1010 may generate an output based on the segmented surgical phases and the surgical video information. The generated output may be surgical activity information 1090 such as an annotated surgical video. The generated output may include information associated with the surgical video (e.g., in metadata), for example, such as information associated with surgical phases, surgical phase transitions, surgical events, surgical tool usage, idle periods, and/or the like.

The computing system 1010 may comprise a processor 1020 and a network interface 1030. The processor 1020 may be coupled to a communication module 1040, storage 1050, memory 1060, non-volatile memory 1070, and input/output (I/O) interface 1080 via a system bus. The system bus can be any of several types of bus structure(s) including the memory bus or memory controller, a peripheral bus or external bus, and or a local bus using any variety of available bus architectures including, but not limited to, 9-bit bus, Industrial Standard Architecture (ISA), Micro-Charmel Architecture (MSA), Extended ISA (EISA), Intelligent Drive Electronics (IDE), VESA Local Bus (VLB), Peripheral Component Interconnect (PCI), USB, Advanced Graphics Port (AGP), Personal Computer Memory Card International Association bus (PCMCIA), Small Computer Systems Interface (SCSI), or any other proprietary bus.

The processor 1020 may be any single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle serial random access memory (SRAM), an internal read-only memory (ROM) loaded with StellarisWare® software, a 2 KB electrically erasable programmable read-only memory (EEPROM), and/or one or more pulse width modulation modules, one or more quadrature encoder inputs (QEI) analogs, one or more 12-bit analog-to-digital converters (ADCs) with 12 analog input channels, details of which are available for the product datasheet.

In an example, the processor 1020 may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

The system memory may include volatile memory and non-volatile memory. The basic input/output system (BIOS), containing the basic routines to transfer information between elements within the computing system, such as during start-up, is stored in non-volatile memory. For example, the non-volatile memory can include ROM, programmable ROM (PROM), electrically programmable ROM (EPROM), EEPROM, or flash memory. Volatile memory includes random-access memory (RAM), which acts as external cache memory. Moreover, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The computing system 1010 also may include removable/non-removable, volatile/non-volatile computer storage media, such as for example disk storage. The disk storage can include, but is not limited to, devices like a magnetic disk drive, floppy disk drive, tape drive, Jaz drive, Zip drive, LS-60 drive, flash memory card, or memory stick. In addition, the disk storage can include storage media separately or in combination with other storage media including, but not limited to, an optical disc drive such as a compact disc ROM device (CD-ROM), compact disc recordable drive (CD-R Drive), compact disc rewritable drive (CD-RW Drive), or a digital versatile disc ROM drive (DVD-ROM). To facilitate the connection of the disk storage devices to the system bus, a removable or non-removable interface may be employed.

It is to be appreciated that the computing system 1010 may include software that acts as an intermediary between users and the basic computer resources described in a suitable operating environment. Such software may include an operating system. The operating system, which can be stored on the disk storage, may act to control and allocate resources of the computing system. System applications may take advantage of the management of resources by the operating system through program modules and program data stored either in the system memory or on the disk storage. It is to be appreciated that various components described herein can be implemented with various operating systems or combinations of operating systems.

A user may enter commands or information into the computing system 1010 through input device(s) coupled to the I/O interface 1080. The input devices may include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 1020 through the system bus via interface port(s). The interface port(s) include, for example, a serial port, a parallel port, a game port, and a USB. The output device(s) use some of the same types of ports as input device(s). Thus, for example, a USB port may be used to provide input to the computing system 1010 and to output information from the computing system 1010 to an output device. An output adapter may be provided to illustrate that there can be some output devices like monitors, displays, speakers, and printers, among other output devices that may require special adapters. The output adapters may include, by way of illustration and not limitation, video and sound cards that provide a means of connection between the output device and the system bus. It should be noted that other devices and/or systems of devices, such as remote computer(s), may provide both input and output capabilities.

The computing system 1010 can operate in a networked environment using logical connections to one or more remote computers, such as cloud computer(s), or local computers. The remote cloud computer(s) can be a personal computer, server, router, network PC, workstation, microprocessor-based appliance, peer device, or other common network node, and the like, and typically includes many or all of the elements described relative to the computing system. For purposes of brevity, only a memory storage device is illustrated with the remote computer(s). The remote computer(s) may be logically connected to the computing system through a network interface and then physically connected via a communication connection. The network interface may encompass communication networks such as local area networks (LANs) and wide area networks (WANs). LAN technologies may include Fiber Distributed Data Interface (FDDI), Copper Distributed Data Interface (CDDI), Ethernet/IEEE 802.3, Token Ring/IEEE 802.5, and the like. WAN technologies may include, but are not limited to, point-to-point links, circuit-switching networks like Integrated Services Digital Networks (ISDN) and variations thereon, packet-switching networks, and Digital Subscriber Lines (DSL).

In various examples, the computing system 1010 and/or the processor module 20093 may comprise an image processor, image-processing engine, media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

The communication connection(s) may refer to the hardware/software employed to connect the network interface to the bus. While the communication connection is shown for illustrative clarity inside the computing system 1010, it can also be external to the computing system 1010. The hardware/software necessary for connection to the network interface may include, for illustrative purposes only, internal and external technologies such as modems, including regular telephone-grade modems, cable modems, optical fiber modems, and DSL modems, ISDN adapters, and Ethernet cards. In some examples, the network interface may also be provided using an RF interface.

In examples, the surgical video 1000 may be a previously recorded surgical video. Many previously recorded surgical videos for a surgical procedure may be available, for example, for the computing system to process and derive information. The previously recorded surgical videos may be from a collection of recorded surgical procedures. The surgical video 1000 may be a recorded surgical video for a surgical procedure that a surgical team may want to analyze. For example, a surgical team may submit a surgical video for analysis and/or review. The surgical team may submit the surgical video to receive feedback or instructions on areas of improvements in the surgical procedure. For example, the surgical team may submit the surgical video for grading.

In examples, the surgical video 1000 may be a live video capture of a live surgical procedure. For example, the live video capture of the live surgical procedure may be recorded and/or streamed by a surveillance system and/or surgical hub within an operating room. For example, the surgical video 1000 may be received from an operating room performing the surgical procedure. The video may be received, for example, from a surgical hub, a surveillance system in the OR, and/or the like. The computing system may perform online surgical workflow recognition as the surgical procedure is performed. The video of the live surgical procedure may be sent to the computing system, for example, for analysis. The computing system may process and/or segment the live surgical procedure, for example, using the live video capture.

In examples, the computing system 1010 may perform processing on the received surgical video. The computing system 1010 may perform image processing, for example, to extract surgical video features and/or surgical video information associated with the surgical video. The surgical video features and/or information may indicate surgical phases, surgical phase transitions, surgical events, surgical tool usage, idle periods, and/or the like. The surgical video features and/or information may indicate the surgical phases associated with the surgical procedure. For example, a surgical procedure may be segmented into surgical phases. The surgical video features and/or information may indicate which surgical phase each part of the surgical video represents.

The computing system 1010 may use a model AI system, for example, to process and/or segment the surgical video. The model AI system may use image processing and/or image classification to extract features and/or information from the surgical video. The model AI system may be a trained model AI system. The model AI system may be trained using annotated surgical video(s). For example, the model AI system may use neural networks to process the surgical video. The neural network may be trained, for example, using the annotated surgical videos.

In examples, the computing system 1010 may use the extracted features and/or information from the surgical video to segment the surgical video. The surgical video may be segmented, for example, into surgical phases associated with the surgical procedure. The surgical video may be segmented into surgical phases, for example, based on identified surgical events or features in the surgical video. For example, a transition event may be identified in the surgical video. The transition event may indicate that the surgical procedure is switching from a first surgical phase to a second surgical phase. The transition event may be indicated based on a change in OR staff, a change in surgical tools, a change in surgical site, a change in surgical activities, and/or the like. For example, the computing system may concatenate frames from the surgical video that occur before a transition event into a first grouping and concatenate frames that occur after the transition event into a second grouping. The first grouping may represent a first surgical phase and the second grouping may represent a second surgical phase.

The computing system may generate a surgical activity prediction result, for example, that may include a prediction result based on the extracted features and/or information and/or based on the segmented videos (e.g., surgical phases). The prediction result may indicate the surgical procedure segmented into workflow phases. The prediction result may include annotations detailing the surgical procedure, for example, such as annotations detailing surgical events, idle periods, transition events, and/or the like.

In examples, the computing system 1010 may generate surgical activity information 1090 (e.g., annotated surgical video, surgical video information, surgical video metadata indicating surgical activity associated with video segments and/or segmented surgical phases). For example, the computing system 1010 may send surgical activity information 1090 to a user. The user may be a surgical team in an OR and/or a medical instructor. The annotations may be generated for each video frame, for a group of video frames, and/or for each video segment corresponding to a surgical activity. For example, the computing system 1010 may extract relevant video segment(s) based on the generated surgical activity information and send the relevant segment(s) of surgical video(s) to a surgical team in an OR to be used while performing a surgical procedure. The surgical team may use the processed and/or segmented video to guide the live surgical procedure.

The computing system may send the annotated surgical video, the prediction result, the extracted features and/or information, and/or the segmented videos (e.g., surgical phases), for example, to a storage and/or other entities. The storage may be a computing system storage (e.g., such as storage 1050 as shown in FIG. 1). The storage may be a cloud storage, edge storage, a surgical hub storage, and/or the like. For example, the computing system may send the output to a cloud storage for future training purposes. The cloud storage may contain the processed and segmented surgical videos for training and/or instructional purposes.

In examples, the storage 1050 (e.g., as shown in FIG. 1) included in the computing system may contain previously segmented surgical phases, previously recorded surgical videos, previous surgical video information associated with a surgical procedure, and/or the like. The storage 1050 may be used by the computing system 1050, for example, to improve the processing performed on the surgical videos. For example, the storage 1050 may use previously processed and/or segmented surgical video to process and/or segment an incoming surgical video. For example, the information stored in the storage 1050 may be used to improve and/or train a model AI system that the computing system 1010 uses to process the surgical videos and/or perform phase segmentation.

Figure 2:
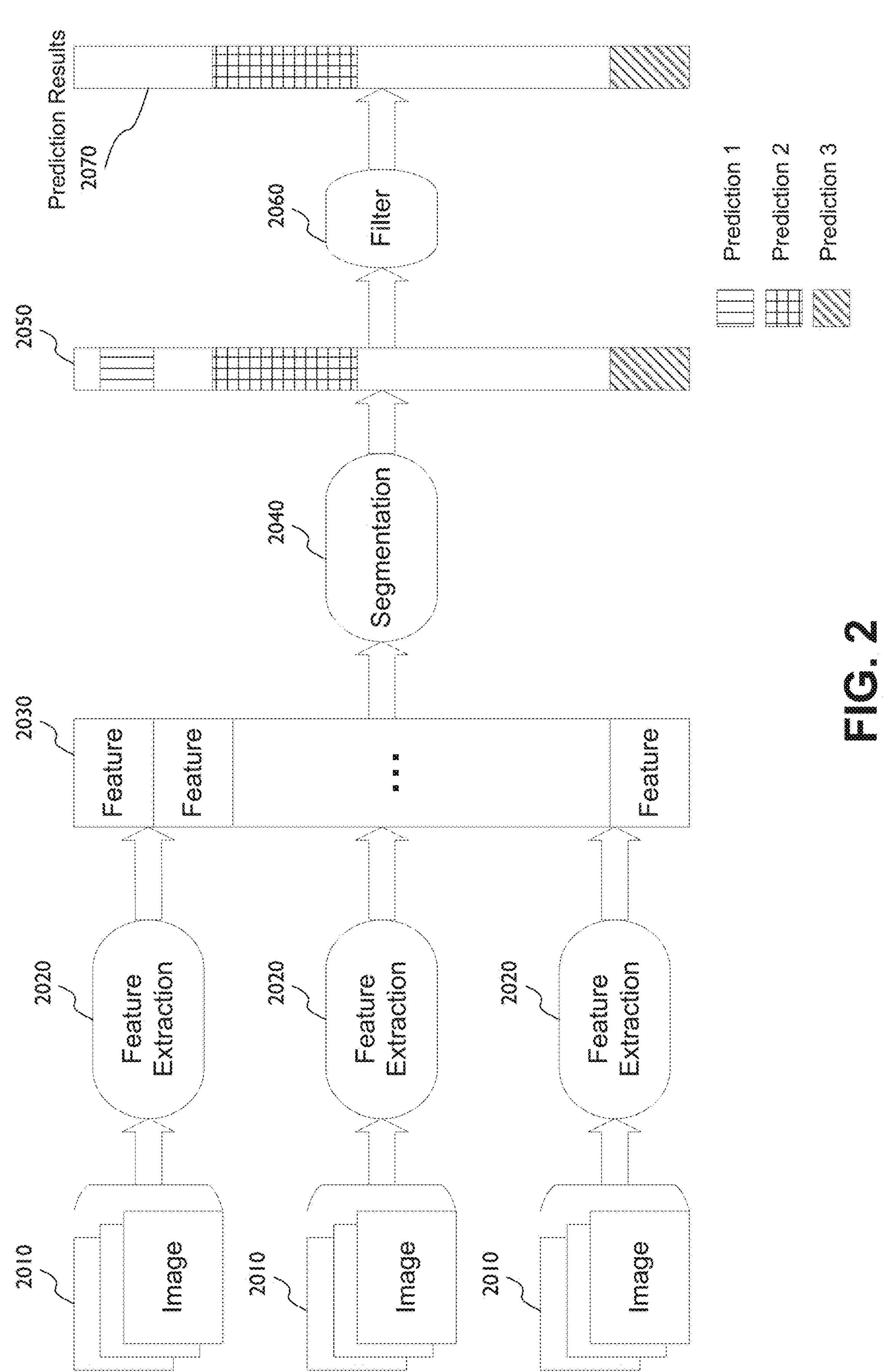
FIG. 2 illustrates an example workflow recognition using feature extraction, segmentation, and filtering on a video to generate a prediction result.

FIG. 2 illustrates an example workflow recognition using feature extraction, segmentation, and filtering on a video to generate a prediction result. A computing system, such as the computing system described herein with respect to FIG. 1, may receive a video, and the video may be divided into a group of frames and/or images. The computing system may take the image(s) 2010 and perform feature extraction on the image(s), for example, as shown at 2020 in FIG. 2.

In examples, feature extraction may include representation extraction. Representation extraction may include extracting a representation summary from the frames/images from the video. The extracted representation summary may be concatenated together, for example, to be a full video representation. The extracted representation summary may include extracted features, probabilities, and/or the like.

In examples, the computing system may perform feature extraction on a surgical video. The computing system may extract features 2030 associated with the surgical procedure performed in the surgical video. The features 2030 summary may indicate surgical phases, surgical events, surgical tools, and/or the like. For example, the computing system may determine that a surgical tool is present in a video frame, for example, based on the feature extraction and/or representation extraction.

As shown in FIG. 2, the computing system may generate features 2030, for example, based on feature extraction performed on the images 2010. The generated features 2030 may be concatenated together, for example, to be a full video representation. The computing system may perform segmentation, for example, on the extracted features (e.g., as shown at 2040 in FIG. 2). The unfiltered prediction result 2050 may include information about the video representation, such as events and/or phases within the video representation. The computing system may perform segmentation, for example, based on the performed feature extraction (e.g., full video representation with extracted features). Segmentation may include concatenating and/or grouping video frames/images. For example, segmentation may include concatenating and/or grouping video frames/images that are associated with similar features summaries. The computing system may perform segmentation to group together video frames/clips with the same feature. The computing system may perform segmentation to divide the recorded video into phases. The phases may be combined together to become the full video representation. The phases may be segmented for analyzing video clips that relate to each other.

Segmentation may include workflow segmentation. For example, in a surgical video, the computing system may segment the full video representation into workflow phases. The workflow phases may be associated with surgical phases in a surgical procedure. For example, the surgical video may include the entire performed surgical procedure. The computing system may perform workflow segmentation to group video clips/frames associated with the same surgical phase together.

As shown in FIG. 2, based on the segmentation, the computing system may generate unfiltered prediction result(s) 2050. The computing system may generate an output based on the performed segmentation. For example, the computing system may generate an unfiltered prediction result (e.g., unfiltered workflow segmentation prediction result). The unfiltered prediction result may include the wrong prediction segment. For example, the unfiltered prediction result may include a surgical phase that was not present in the surgical video.

As shown in FIG. 2, at 2060, the computing system may filter the unfiltered prediction result 2050, for example. Based on the filtering, the computing system may generate prediction result(s) 2070. The prediction result(s) 2070 may represent phases and/or events associated with the video. The computing system may perform feature extraction, segmentation, and/or filtering on a video to generate a prediction result associated with one or more of workflow recognition, surgical event detection, surgical tool detection, and/or the like. The computing system may perform filtering, for example, on the unfiltered prediction result. Filtering may include noise filtering, for example, such as using predetermined rules (e.g., set by humans or automatically derived overtime), a smooth filter (e.g., median filter), and/or the like. Noise filtering may include prior knowledge noise filtering. For example, the unfiltered prediction result may include incorrect predictions. The filtering may remove the incorrect predictions to generate an accurate prediction result, which may include accurate information associated with the video.

In examples, a computing system may perform filtering on an unfiltered prediction result associated with a surgical video and surgical procedure. In surgical videos, surgeons may idle or pull out surgical tools during the middle of a surgical phase. The unfiltered prediction result may be inaccurate (e.g., the feature extraction and segmentation may generate inaccurate predictions result). The inaccuracies associated with the unfiltered prediction result may be corrected, for example, using filtering. Filtering may include using prior knowledge noise filtering (PKNF). PKNF may be used on unfiltered prediction results, such as for offline surgical workflow recognition (e.g., determining workflow information associated with a surgical video). The computing system may perform PKNF, for example, on the unfiltered prediction result. PKNF may take into consideration phase order, phase incidence, and/or phase time. For example, in the surgical procedure context, PKNF may take into consideration surgical phase order, surgical phase incidence, and/or surgical phase time.

The computing system may perform PKNF, for example, based on surgical phase order. For example, surgical procedure may include a set of surgical phases. The set of surgical phases in the surgical procedure may follow a specific order. An unfiltered prediction result may represent surgical phases that do not follow the specific phase order where it should.

For example, the unfiltered prediction result may include a surgical phase that is out of order inconsistent with the specific phase order associated with the surgical procedure. For example, the unfiltered prediction result may include a surgical phase that is not included in the specific phase order associated with the surgical procedure. The computing system may perform PKNF by selecting a label that the model AI system has the highest confidence, for example, based on the possible labels according to the phase order.

The computing system may perform PKNF, for example, based on surgical phase time. For example, the computing system may check the prediction segments (e.g., predicted phases) that share the same prediction labels in the unfiltered prediction result. For prediction segments of the same surgical phase, the computing system may connect the prediction segments, for example, if the time interval between the prediction segments is shorter than a connection threshold set for the surgical phase. The connection threshold may be the time associated with the length of a surgical phase. The computing system may calculate the surgical phase time, for example, for each surgical phase prediction segment. The computing system may correct prediction segments, for example, that are too short to be a surgical phase.

The computing system may perform PKNF, for example, based on surgical phase incidence. The computing system may determine that some surgical phases happen (e.g., only happen) less than a set number of times (e.g., less than a fixed incidence number). The computing system determine that multiple segments for the same phase are represented in the unfiltered prediction result. The computing system may determine that the number of segments for the same phase represented in the unfiltered prediction result exceeds the incidence threshold number associated with the surgical phase. Based on the determination that the number of segments for the same phase exceeds the incidence threshold number, the computing system may select a segment, for example, according to the ranking of the model AI system's confidence.

Accurate solutions for video-based surgical workflow recognition may be achieved with low computational cost. For example, the computing system may use neural networks with the model AI system to determine information from a recorded surgical video. The neural networks may include a convolutional neural network (CNN), a recurrent neural network (RNN), a transformer neural network, and/or the like. The computing system may use the neural networks to determine spatial information and temporal information. Computing system may use neural networks in combination. For example, the computing system may use both a CNN and an RNN together, for example, to capture both spatial and temporal information associated with each video segment in a surgical video. For example, the computing system may use ResNet50 as a 2D CNN to extract visual features frame by frame from the surgical video to capture spatial information and use a 2-stage causal temporal convolutional network (TCN) to capture global temporal information from extracted features for surgical workflow.

Figure 3:
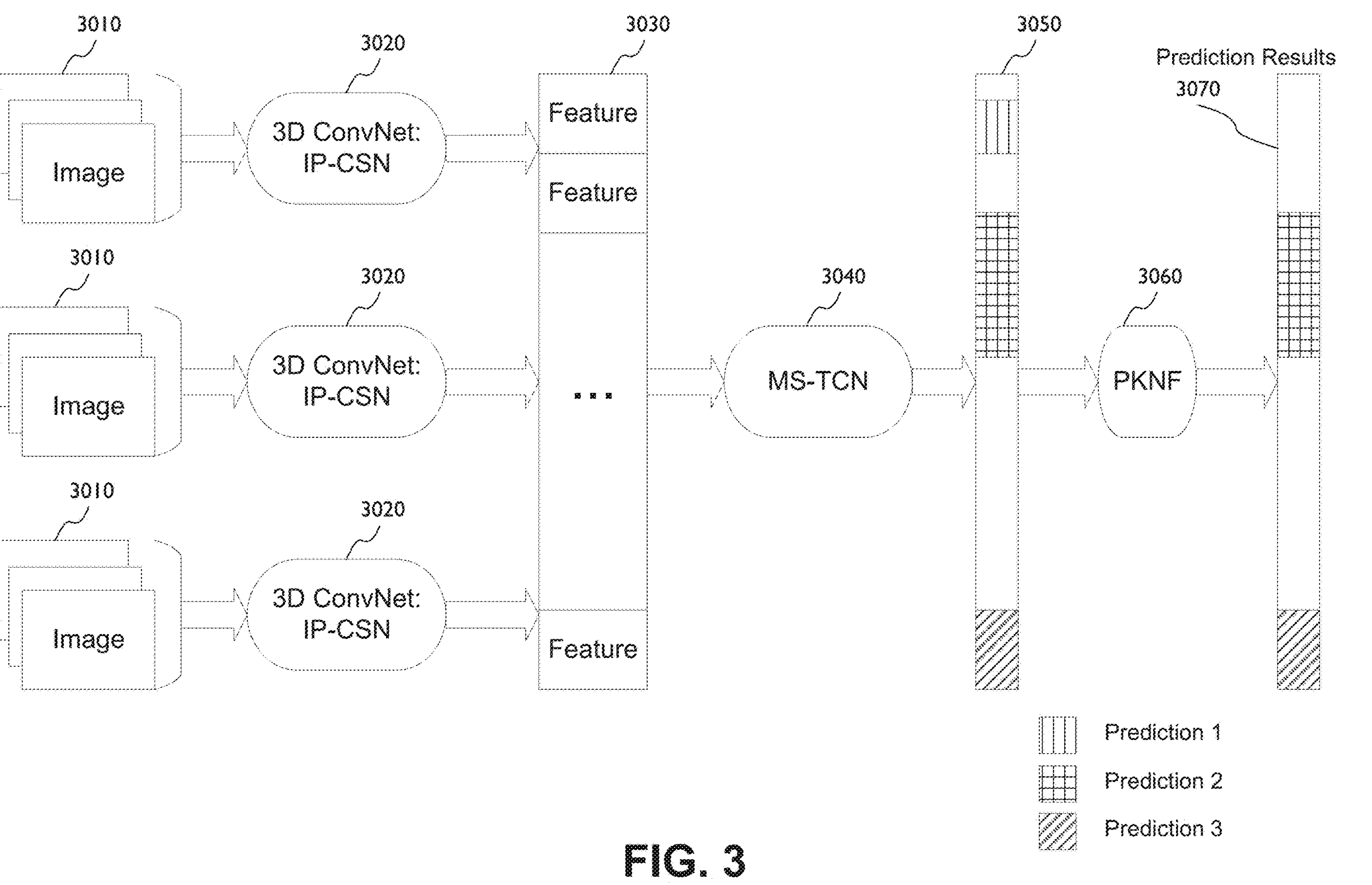
FIG. 3 illustrates an example computer vision-based workflow, event, and tool recognition.

FIG. 3 illustrates an example computer vision-based workflow, event, and tool recognition. Workflow recognition (e.g., surgical workflow recognition) may be implemented in operating rooms, for example, using a computing system, such as the computing system described herein with respect to FIG. 1. The computing system may use a computer vision-based system for achieving surgical workflow recognition. For example, the computing system may use spatial information and/or temporal information derived from a video (e.g., surgical video) to achieve surgical workflow recognition. In examples, the computing system may perform (e.g., to achieve surgical workflow recognition) one or more of feature extraction, segmentation, or filtering on a video (e.g., as described herein with respect to FIG. 2). As shown in FIG. 3, a video may be divided into video clips and/or images 3010. The computing system may perform feature extraction on the images 3010. As shown at 3020 in FIG. 3, the computing system may use an interaction-preserved channel-separated convolutional network (IP-CSN), for example, to extract features 3030 that contain spatial information and/or local temporal information from the video (e.g., surgical video) through segments. The computing system may train a multi-stage temporal convolutional network (MS-TCN), for example, with the extracted features 3030. As shown at 3040 in FIG. 3, the computing system may train the MS-TCN with the extracted features 3030 to capture global temporal information from the video (e.g., surgical video). The global temporal information from the video may include an unfiltered prediction residual 3050. As shown at 3060 in FIG. 3, the computing system may filter prediction noise from the output of the MS-TCN (e.g., the unfiltered prediction residual 3050), for example, using PKNF. The computing system may use the computer vision-based recognition architecture for surgical procedure surgical workflow recognition. The computing system may achieve high frame-level accuracy in surgical workflow recognition for surgical procedures. The computing system may capture spatial and local temporal information in short video segments with an IP-CSN and capture global temporal information in the full video with an MS-TCN.

The computing system may use, for example, a feature extraction network. Video action recognition networks may be used to extract features for a video clip. Training video action recognition networks from scratch may use (e.g., require) a large amount of training data. Video action recognition networks may use pre-trained weights, for example, to train the network.

The computing system may use an action segmentation network, for example, to achieve workflow recognition for a full surgical video. The computing system may extract and concatenate the features from video clips derived from the full video, for example, based on the video action recognition networks. The computing system may determine full video features for surgical workflow recognition, for example, using the action segmentation network. The action segmentation network may use a long short-term memory (LSTM) network, for example, to achieve surgical workflow recognition with the features of the surgical video. The action segmentation network may use an MS-TCN, for example, to achieve surgical workflow recognition with the features of the surgical video.

In examples, the computing system may use the computer vision-based recognition architecture (e.g., as described herein with respect to FIG. 3) to achieve surgical workflow recognition. The computing system may implement a deep 3D CNN (e.g., IP-CSN) to capture spatial and local temporal features video segment by video segment. The computing system may use an MS-TCN to capture global temporal information from the video. The computing system may use PKNF to filter prediction noise from the MS-TCN output, for example, for offline surgical workflow recognition. The computer vision-based recognition architecture may be referred to as an IPCSN-MSTCN-PKNF workflow.

In examples, the computing system may perform inference using the computer vision-based architecture (e.g., as described herein with respect to FIG. 3) to achieve surgical workflow recognition. The computing system may receive a surgical video. The computing system may receive a surgical video associated with an on-going surgical procedure for online surgical workflow recognition. The computing system may receive a surgical video associated with a previously performed surgical procedure for offline surgical workflow recognition. The computing system may divide the surgical video into short video segments. For example, the computing system may divide the surgical video into group of frames and/or images 3010, as shown in FIG. 3. The computing system may use an IP-CSN to extract features 3030, for example, from the images 3010 (e.g., as shown at 3020 in FIG. 3). Each extracted feature may be considered as a summary of the video segment and/or group of images 3010. The computing system may concatenate the extracted features 3030, for example, to achieve full video features. The computing system may use an MS-TCN on the extracted features 3030, for example, to achieve initial surgical phase segmentation for the full surgical video (e.g., unfiltered prediction result for surgical workflow). The computing system may filter the initial surgical phase segmentation output from the MS-TCN, for example, using PKNF. Based on the filtering, the computing system may generate a refined prediction result for the full video.

In examples, the computing system may build an AI model using the computer vision-based recognition (e.g., as described herein with respect to FIG. 3) for offline surgical workflow recognition. The computing system may train the AI model for example, using transfer learning. The computing system may conduct transfer learning on a dataset, for example, using an IP-CSN. The computing system may use the IP-CSN to extract features for the dataset. The computing system may train an MS-TCN, for example, using the extracted features. The computing system may filter (e.g., using PKNF), the prediction noise from the MS-TCN output.

The computing system may use an IP-CSN, for example, for feature extraction. The computing system may use a 3D CNN to capture spatial and temporal information in video segments. A 2D CNN may be inflated along the temporal dimension, for example, to obtain an inflated 3D CNN (I3D). An RGB stream and an optical flow stream may be used, for example, to design a two-stream I3D solution. For example, a CNN such as R(2+1)D may be used. R(2+1)D may focus on factoring 3D convolution in space and time. A channel-separated convolutional network (CSN) may be used. A CSN may focus on factoring 3D convolution, for example, by separating channel interaction and spatiotemporal interaction. R(2+1)D and/or a CSN may be used to improve accuracy and lower computational cost.

In examples, a CSN may outperform two-stream I3D and R(2+1)D on a dataset (e.g., Kinetics-400 dataset). The CSN model may perform better (e.g., as compared to two-stream I3D, R(2+1)D, and/or the like), for example, with large-scale weakly-supervised pretraining on a dataset (e.g., IG-65M dataset). From a computation standpoint, the CSN may use (e.g., need to use) the RGB stream (e.g., only the RGB stream) as input as compared to the optical flow stream in two-stream I3D using (e.g., needing to use) expensive computation. The CSN may be used, for example, to design an interaction-preserved channel-separated convolutional network (IP-CSN). The IP-CSN may be used for workflow recognition applications.

Figure 4:
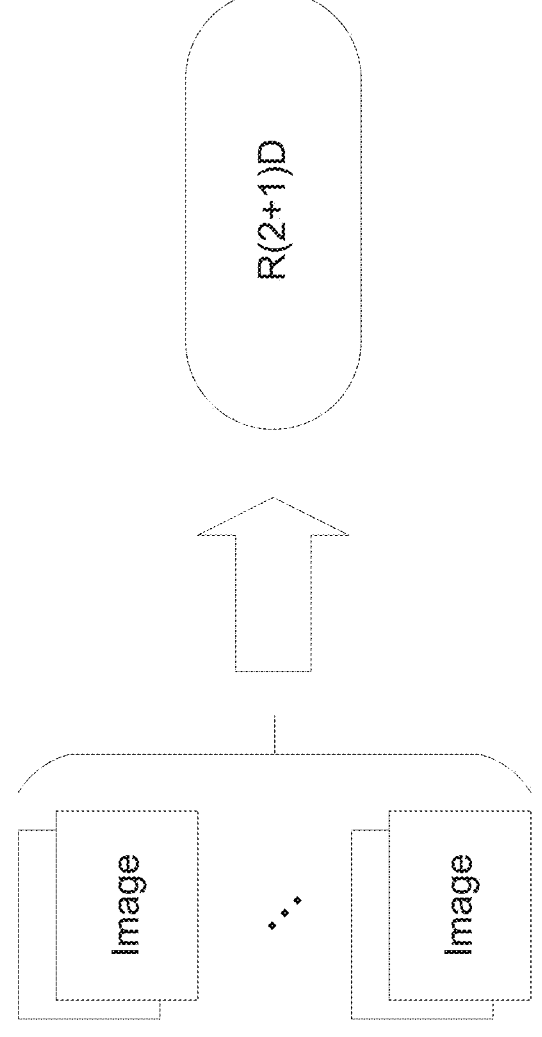
FIG. 4 illustrates an example feature extraction network using a fully convolutional network.

The computing system may use a fully convolution network, for example, for the feature extraction network. FIG. 4 illustrates an example feature extraction network using a fully convolutional network. R(2+1)D may be a fully convolutional network (FCN). R(2+1)D may be an FCN derived from a ResNet architecture. R(2+1)D may use separate convolutions (e.g., spatial and temporal convolutions), for example, to capture context from video data. The receptive field of R(2+1)D may extend spatially in the frame width and height dimensions and/or through the third dimension (e.g., which may represent time).

In examples, R(2+1)D may be composed of layers. For example, R(2+1)D may include 34 layers, which may be considered a compact version of R(2+1)D. Initial weights to be used for the layers of R(2+1)D may be obtained. For example, R(2+1)D may use initial weights pre-trained on a dataset, for example, such as the IG-65M dataset and/or the Kinetics-400 dataset.

Figure 5:
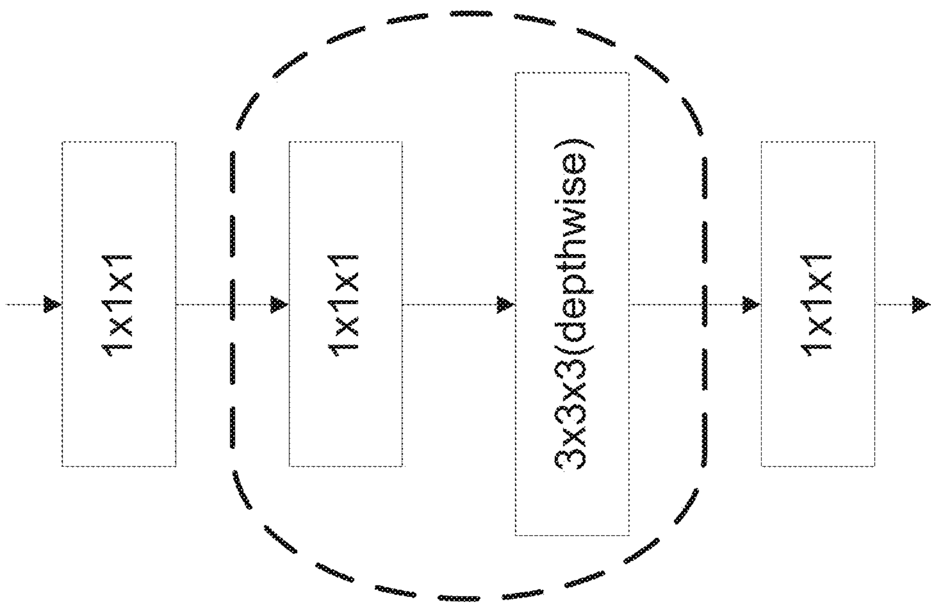
FIG. 5 illustrates an example interaction-preserved channel-separated convolutional network bottleneck block.
Figure 5:
Figure 5:
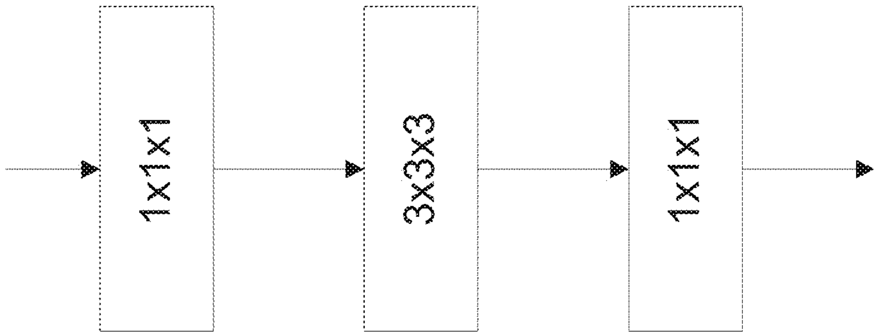

FIG. 5 illustrates an example IP-CSN bottleneck block. In examples, a CSN may be a 3D CNN where the convolutional layers (e.g., all convolutional layers) are 1×1×1 convolutions or k×k×k depthwise convolutions. A 1×1×1 convolution may be used for channel interactions. A k×k×k depthwise convolution may be used for local spatiotemporal interactions. As shown in FIG. 5, a 3×3×3 convolution may be replaced with a 1×1×1 traditional convolution and a 3×3×3 depthwise convolution. The standard 3D bottleneck block in 3D ResNet may be changed into an IP-CSN bottleneck block. The IP-CSN bottleneck block may reduce parameters and FLOPs (e.g., of the traditional 3×3×3 convolution). The IP-CSN bottleneck block may preserve (e.g., all) channel interactions with the added 1×1×1 convolution.

A 3D CNN may be trained, for example, from scratch. A large amount of video data may be used for training the 3D CNN from scratch. Transfer learning may be conducted, for example, to train the 3D CNN from scratch. For example, initial weights pretrained on datasets (e.g., IG-65M and/or Kinetics-400 datasets) may be used to train the 3D CNN. Videos (e.g., surgical videos) may be annotated with labels (e.g., class labels), for example, for training. In examples, surgical videos may be annotated with class labels, for example, where some class labels are surgical phase labels and other class labels are not surgical phase labels. The start time and end time for each class label may be annotated. The IP-CSN may be fine-tuned, for example, using the data set. The IP-CSN may be fine-tuned based on the dataset, for examples, using a randomly selected video segment from inside each annotation segment that is longer than a set time. Frames may be sampled with constant intervals as one training sample from the video segment. For example, a 19.2 second video segment may be randomly selected inside each annotation segment that is longer than 19.2 seconds. Thirty two (32) frames may be sampled with constant intervals as a (e.g., one) training sample from the 19.2 second video segment.

Figure 6:
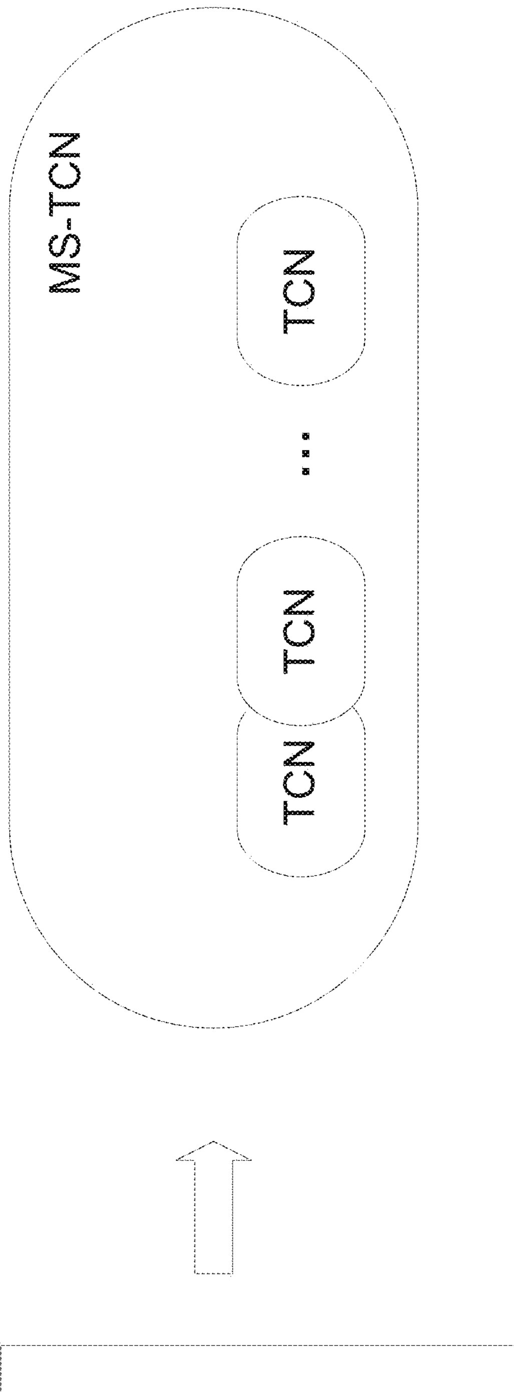
FIG. 6 illustrates an example action segmentation network using a multi-stage temporal convolutional network.

The computing system may use a fully convolutional network, for example, for surgical phase segmentation. FIG. 6 illustrates an example action segmentation network using an MS-TCN. The computing system may use an MS-TCN, for example, for surgical phase segmentation. The MS-TCN may operate on the full temporal resolution of the video data. The MS-TCN may include stages, for example, where each stage may be refined by the previous stage. The MS-TCN may include dilated convolutions, for example, in each stage. Including dilated convolutions in each stage may allow the model to have less parameters with a large temporal receptive field. Including dilated convolutions in each stage may allow the model to use the full temporal resolution of the video data. For example, the MS-TCN may follow IP-CSN, for example, to incorporate the global temporal features in the full video.

In examples, the computing system may use a four-stage acausal TCN (e.g., instead of a 2-stage causal TCN), for example, to capture global temporal information from the video. The computing system may receive an input X (e.g., where X={x1, x2, . . . , xt}). Given the input X, the computing system may use the MS-TCN to predict the output P (e.g., where P={P1, P2, . . . , Pt). For example, tin the input X and output P may be a time step (e.g., current time step), where 1≤t≤T. T may be the number of total time steps. Xt may be a feature input at time step t. Pt may be an output prediction for the current time step. For example, the input X may be a surgical video, and Xt may be a feature input at time step t in the surgical video. Output P may be a prediction result associated with the surgical video input. The output P may be associated with a surgical event, surgical phase, surgical information, surgical tool, idle period, transition step, phase boundary and/or the like. For example, Pt may be a surgical phase that is occurring at time t in the surgical video input.

Figure 7:
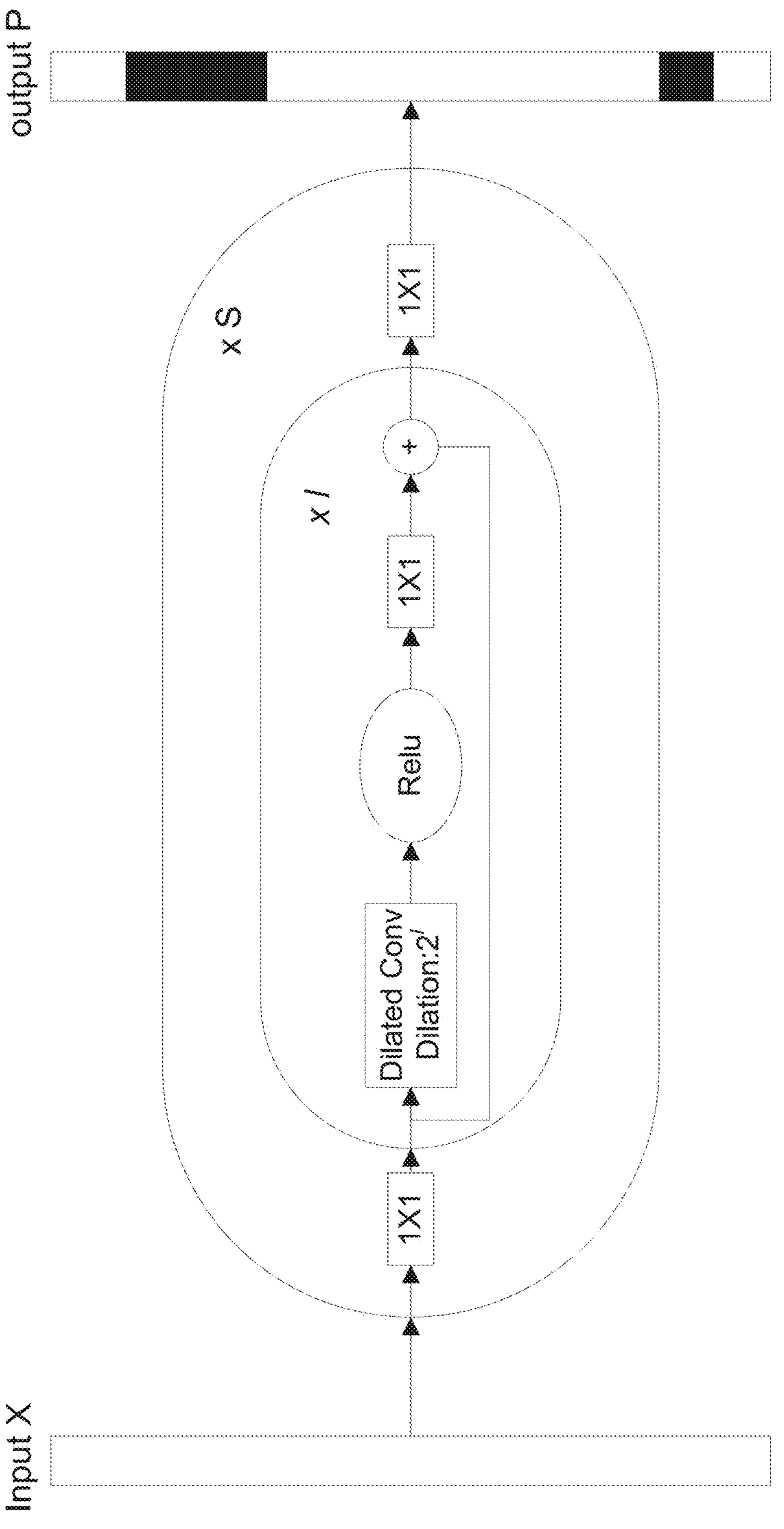
FIG. 7 illustrates an example multi-stage temporal convolutional network architecture.

FIG. 7 illustrates an example MS-TCN architecture. In examples, the computing system may receive an input X and apply the MS-TCN to the input X. The MS-TCN may include layers, for example, such as temporal convolutional layers. The MS-TCN may include a first layer (e.g., in a first stage), for example, such as a first 1×1 convolutional layer. The first 1×1 convolutional layer may be used to match the dimensions of the input X with a feature map number in the network. The computing system may use one or more layers of dilated 1D convolution on the output of the first 1×1 convolutional layer. For example, the layer(s) of dilated 1D convolution with the same number of convolutional filters and a kernel size of three may be used. The computing system may use RelU activation, for example, in each layer (e.g., of the MS-TCN) as shown in FIG. 7. Residual connections may be used, for example, to facilitate gradients flow. Dilated convolution may be used. The use of a dilated convolution may increase the receptive field. The receptive field may be calculated, for example, based on Eq. 1.

$$RF(l)=2^{(l+1)}-1 \qquad \text{Eq. 1}$$

For example, l may indicate the layer number and l∈[1, L], for example, where L may indicate the total number of dilated convolution layers. After the last dilated convolution layer, the computing system may use a second 1×1 convolution layer and a softmax activation, for example, to generate initial predictions from the first stage. The computing system may refine the initial predictions, for example, using additional stages. An (e.g., each) additional stage may take initial predictions from the previous stage and refine them. For a classification loss (e.g., in MS-TCN), a cross-entropy loss may be calculated, for example, using Eq. 2.

$$L_{cls}=\frac{1}{T}\sum_{t}-\log(p_{t,c}) \qquad \text{Eq. 2}$$

For example, $p_{t,c}$ may indicate the predicted probability, for example, at class c at time step t. Smooth loss may reduce over-segmentation. For smooth loss to reduce over-segmentation, the truncated mean square error may be calculated, for example over the frame-wise log-probabilities according to Eqs. 3 and 4.

$$L_{T-MSE}=\frac{1}{TC}\sum_{t,c}\log(p_{t,c})-\log(p_{t-1,c})\vee^2 \text{ for} \qquad \text{Eq. 3}$$

-continued $$L_{T-MSE}=\frac{1}{TC}\sum_{t,c}\tau^2 \text{ otherwise} \qquad \text{Eq. 4}$$

For example, C may indicate the total number of classes, τ may indicate a threshold value. The final loss function may sum the losses over stages, which may be calculated, for example, according to Eq. 5.

$$L_{final}=\Sigma_S(L_{cls}+\lambda L_{T-SE}) \qquad \text{Eq. 5}$$

For example, S may indicate the total stage number for MS-TCN. For example, λ may be a weighted parameter.

In surgical videos, surgeons may idle or pull out surgical tools during a surgical phase. For the video segments associated with idle periods and/or with surgeons pulling out surgical tools in the middle of the surgical phase, a deep learning model may predict inaccurately. The computing system may apply filtering, for example, such as PKNF. The filtering may identify the inaccurate predictions generated by a deep learning model.

The computing system may use PKNF (e.g., for offline surgical workflow recognition). PKNF may take into consideration, for example, surgical phase order, surgical phase incidence, and/or surgical phase time (e.g., as described herein).

For example, the computing system may perform filtering based on a predetermined surgical phase order. Surgical phases in a surgical procedure may follow a specific order (e.g., in the predetermined surgical phase order). The computing system may correct a prediction from MS-TCN, for example, if the prediction does not follow the proper specific phase order. The computing system may correct the prediction, for example, by selecting a label that the model has the highest confidence in, e.g., from the possible labels according to phase order.

For example, the computing system may perform filtering based on surgical phase time. The computing system may run a statistical analysis on the annotation (e.g., in the unfiltered prediction result), for example, to get the minimum phase time T (e.g., where $T=\{T_1, T_2, \ldots, T_N\}$ and where N may be the total number of the surgical phases). The computing system may check the prediction segments that share the same prediction labels from MS-TCN. The computing system may connect adjacent prediction segments that share the same prediction label, for example, if the time interval between the prediction segments is shorter than the connection threshold set for the surgical phase. The computing system may correct prediction segments that are too short to be a surgical phase.

For example, the computing system may perform filtering based on surgical phase incidence (e.g., surgical phase occurrence count). Surgical phases may occur (e.g., only occur) a fixed incidence number of times during a surgical procedure. The computing system may detect the incidence number associated with a surgical phase in the surgical procedure, for example, based on a statistical analysis on the annotation. If multiple segments of the same phase show up in the prediction and the computing system determines that the number of segments exceeds a phase incidence threshold value set for the surgical phase, the computing system may select segments, for example according to the ranking of the model's confidence.

In examples, the computing system may perform online surgical workflow recognition for a live surgical procedure. The computing system may adapt the computer vision-based recognition architecture (e.g., as described herein with respect to FIG. 3) for online surgical workflow recognition.

For example, the computing system may use IPCSN-MSTCN for online surgical workflow recognition. During online inference, spatial and local temporal features extracted by IP-CSN may be saved by video segment. At time step t, the computing system may read in features extracted prior to time step t, for example, together with the features extracted at time step t, e.g., to build a feature set F (e.g., where $F=\{f_1, f_2, \ldots, f_t\}$). The computing system may send the feature set F to an MS-TCN to generate a prediction output P (e.g., where $P=\{P_1, P_2, \ldots, P_t\}$). $P_t$ may be the online prediction result at time step t. For example, the prediction output P may be a prediction result associated with an online surgical procedure. Prediction output P may include the prediction results such as surgical activity, surgical events, surgical phases, surgical information, surgical tool usage, idle periods, transition steps, and/or the like associated with the live surgical procedure. For example, Pt may be the prediction result for the current surgical phase.

Surgical workflow recognition may be achieved, for example, by using natural language processing (NLP) techniques. NLP may be a branch of artificial intelligence corresponding with understanding and generating human language. NLP techniques may correspond with extracting and/or generating information and context associated with human language and words. For example, NLP techniques may be used to process natural language data. NLP techniques may be used to process natural language data, for example, to determine information and/or context associated with the natural language data. NLP techniques may be used, for example, to classify and/or categorize natural language data. NLP techniques may be applied to computer vision and/or image processing (e.g., image recognition). For example, NLP techniques may be applied to images to generate information associated with the images processed. A computing system applying NLP techniques to image processing may generate information and/or tags associated with the image. For example, a computing system may use NLP techniques with image processing to determine information associated with an image, such as an image classification. A computing system may use NLP techniques with surgical images, for example, to derive surgical information associated with the surgical images. The computing system may use NLP techniques to classify and categorize the surgical images. For example, NLP techniques may be used to determine surgical events in a surgical video and create an annotated video representation with the determined information.

NLP may be used, for example, for producing a representation summary (e.g., feature extraction) and/or interpreting the representation summary (e.g., segmentation). NLP techniques may include using a transformer, a universal transformer, bidirectional encoder representations from transformers (BERT), a longformer, and/or the like. NLP techniques may be applied to the computer vision-based recognition architecture (e.g., as described herein with respect to FIG. 3), for example, to achieve surgical workflow recognition. NLP techniques may be used throughout the computer vision-based recognition architecture and/or replace components of the computer vision-based recognition architecture. The placement of NLP techniques within the surgical workflow recognition architecture may be flexible. For example, NLP techniques may replace and/or supplement the computer vision-based recognition architecture. In examples, transformer-based modeling, a convolution design, and/or a hybrid design may be used. For example, using NLP techniques may enable analyzing longform surgical videos (e.g., videos up to or exceeding an hour in length. Without NLP techniques and/or transformers, analysis of longform surgical videos may be limited, for example, to inputs of 500 seconds or less.

Figure 8A:
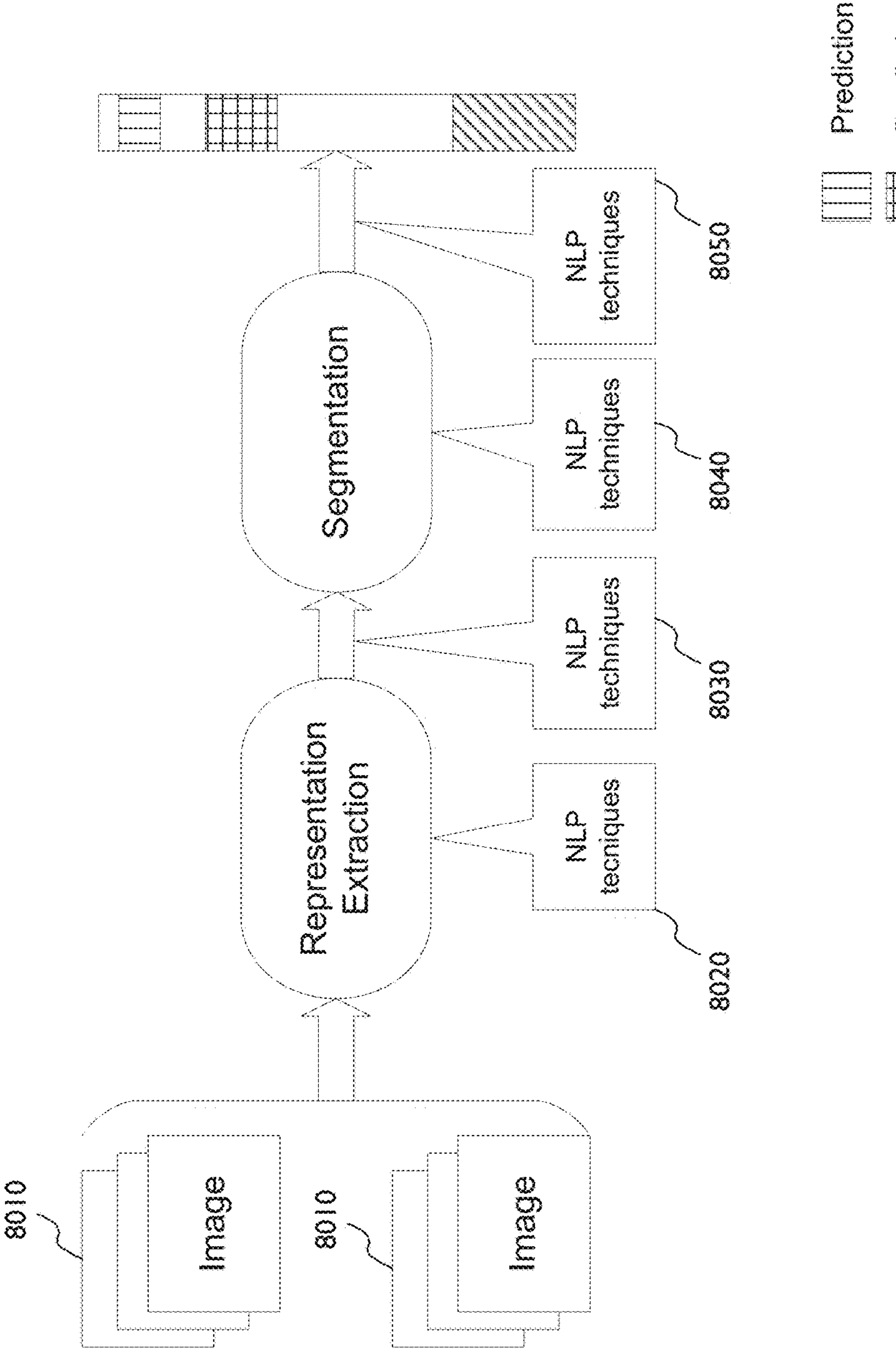
FIG. 8A illustrates example placements for natural language processing within a computer vision-based recognition architecture for surgical workflow recognition.

FIG. 8A illustrates example placements for NLP techniques within a computer vision-based recognition architecture for surgical workflow recognition. NLP techniques may be performed on images 8010 associated with a surgical video. In examples, the NLP techniques may be inserted in one or more places within the workflow recognition pipeline such as the following: with representation extraction (e.g., as shown at 8020 in FIG. 8A), between representation extraction and segmentation (e.g., as shown at 8030 in FIG. 8A), with segmentation (e.g., as shown at 8040 in FIG. 8A), and/or after segmentation (e.g., as shown at 8050 in FIG. 8A). NLP techniques may be performed in multiple places in the workflow recognition pipeline (e.g., at 8020, 8030, 8040, and/or 8050) at the same time. For example, ViT-BERT (e.g., a fully transformer design) may be used (e.g., at 8020 in FIG. 8A).

Figure 8B:
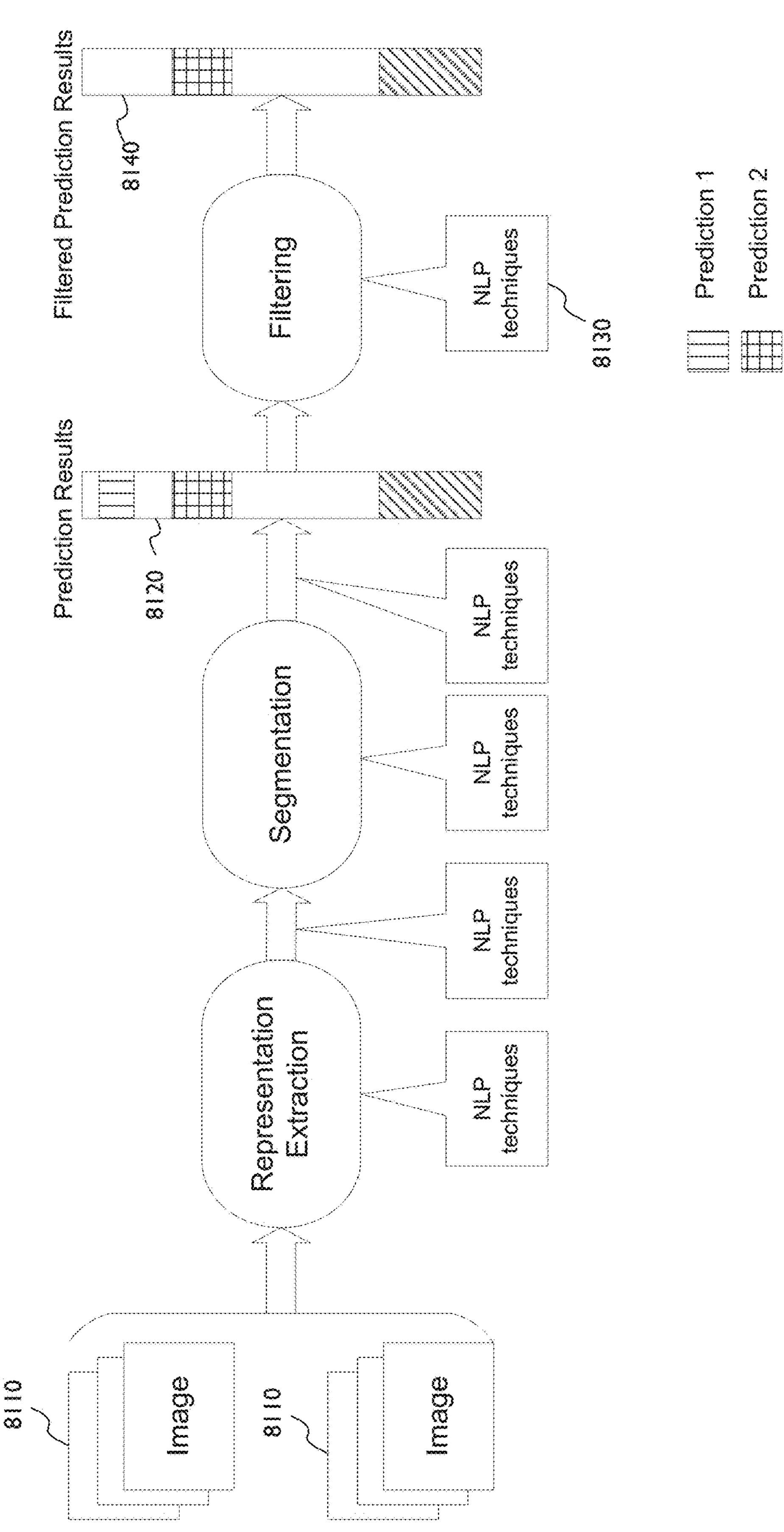
FIG. 8B illustrates an example placement for natural language processing within a filtering portion of a computer vision-based recognition architecture for surgical workflow recognition.

FIG. 8B illustrates an example placement for NLP techniques within a filtering portion of a computer vision-based recognition architecture for surgical workflow recognition. NLP techniques may be performed on images 8110 associated with a surgical video. The NLP techniques may be used in the filtering portion of the workflow recognition pipeline (e.g., as shown at 8130). For example, the computer vision-based recognition architecture may perform representation extraction and/or segmentation on the images 8110. The computer vision-based recognition architecture may generate prediction results 8120. The prediction results may be filtered, for example, by the computing system. The filtering may use NLP techniques, for example, as shown at 8130. The output of the filtering (e.g., using NLP techniques) may be filtered prediction results (e.g., as shown at 8140 in FIG. 8B). For example, the prediction results 8120 may indicate three different surgical phases during a surgical procedure (e.g., as shown by Prediction 1, Prediction 2, and Prediction 3 in FIG. 8B). After filtering, the filtered prediction results may remove inaccurate predictions. For example, the filtered prediction results 8140 may indicate two different surgical phases (e.g., as shown by Prediction 2 and Prediction 3 in FIG. 8B). The filtering may have removed an inaccurately predicted Prediction 1.

Figure 9:
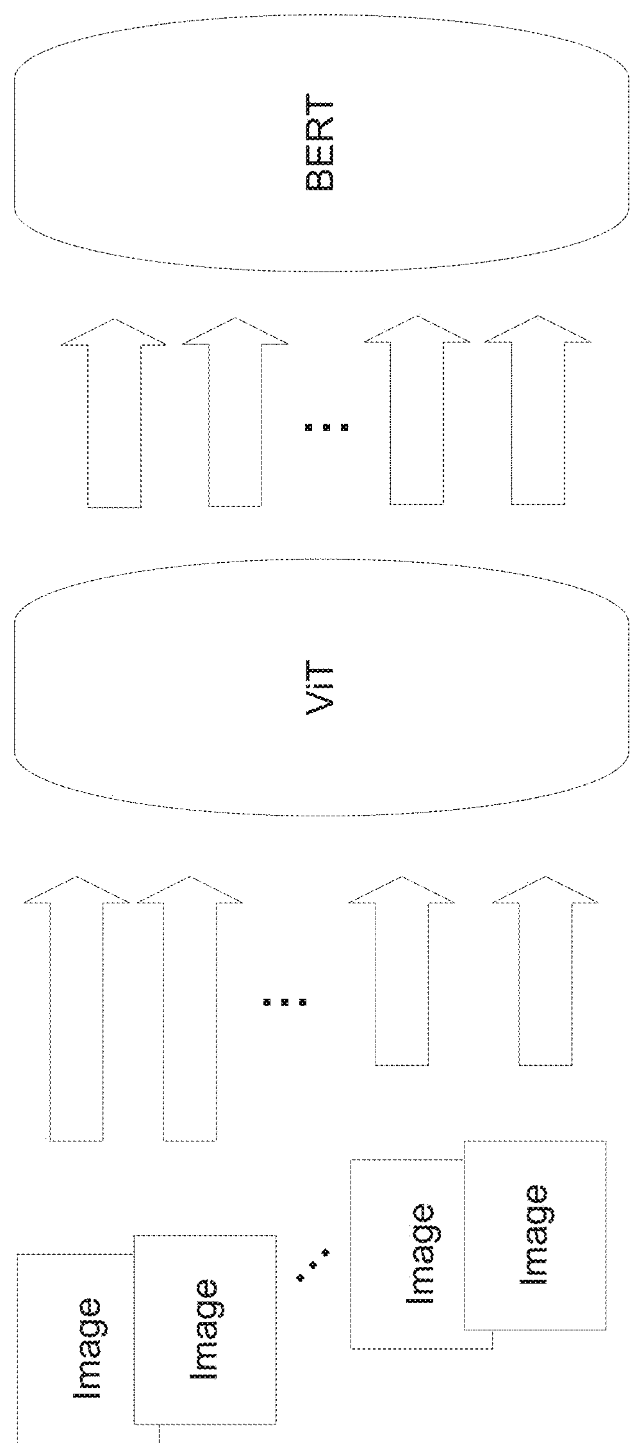
FIG. 9 illustrates an example feature extraction network using transformers.

For example, the computing system may apply NLP techniques during representation extraction. The computing system may, for example, use a fully transformer network. FIG. 9 illustrates an example feature extraction network using transformers. The computing system may use a BERT network. The BERT network may detect context relations bidirectionally. The BERT network may be used for text understanding. The BERT network may enhance the performance of the representation extraction network, for example, based on its ability of context awareness. The computing system may use a combined network to perform representation extraction, such as R(2+1)D-BERT.

In examples, the computing system may use attention, for example, to improve temporal video understanding. The computing system may use a TimeSformer for video action recognition. TimeSformer may use divided space-time attention, for example, where temporal attention is applied before spatial attention. The computing system may use a space time attention model (STAM) and/or a video vision transformer (ViViT) with factorized encoder. The computing system may use spatial transformers (e.g., before temporal transformers), for example, to assist in video action recognition. The computing system may use a vision transformer (ViT), for example, as a spatial transformer to capture spatial information from video frames. The computing system may use a BERT network, for example as a temporal transformer to capture temporal information between video frames from the features extracted by the spatial transformer. Initial weights for ViT models may be obtained. The computing system may use ViT-B/32 as the ViT model. The ViT-B/32 model may be pre-trained, for example, using a dataset (e.g., ImageNet-21 dataset). The computing system may use an additional classification embedding in the BERT, for example, for classification purposes (e.g., following the design of R(2+1)D-BERT).

Figure 10:
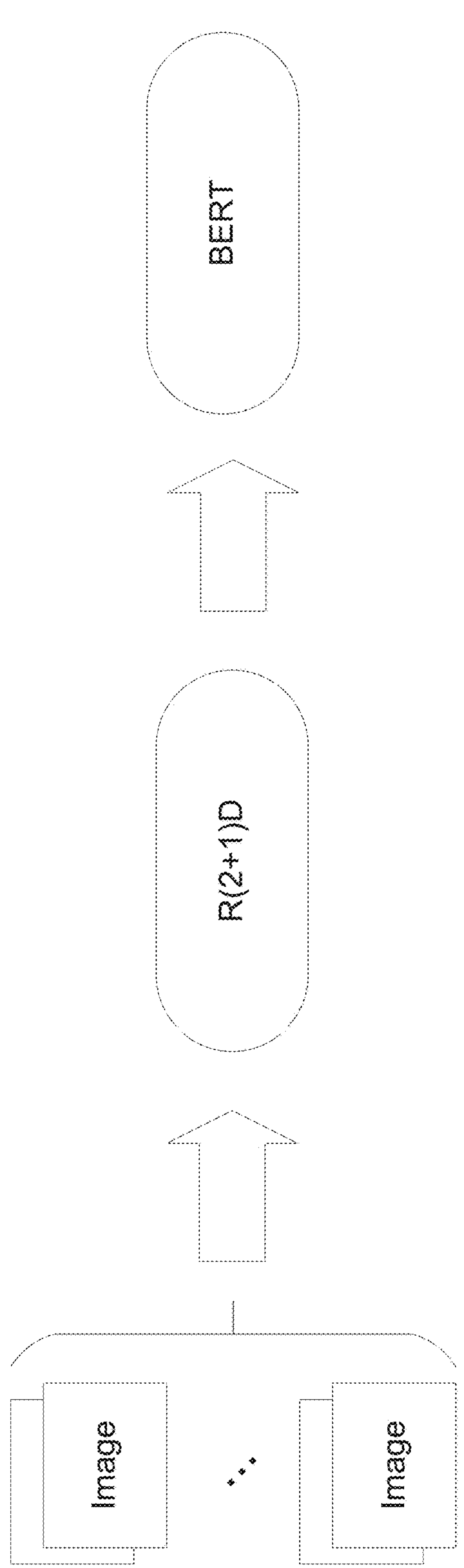
FIG. 10 illustrates an example feature extraction network using a hybrid network.

In examples, the computing system may use a hybrid network, for example, for representation extraction. FIG. 10 illustrates an example feature extraction network using a hybrid network. The hybrid feature extraction network may use both convolution and a transformer for feature extraction. R(2+1)D-BERT may be a hybrid approach, for example, to action recognition. Temporal information from video clips may be better captured, for example, by replacing the temporal global average pooling (TGAP) layer at the end of the R(2+1)D model with the BERT layer. The R(2+1)D-BERT model may be trained, for example, with pre-trained weights from a large-scale weakly-supervised pre-training on a dataset (e.g., IG-65M dataset).

For example, the computing system may apply NLP techniques between representation extraction and segmentation. The computing system may use a transformer (e.g., between representation extraction and segmentation), for example, where the input to the transformer may be the representation summary (e.g., extracted features) generated from representation extraction. The computing system may generate an NLP encoded representation summary using the transformer. The NLP encoded representation summary be used for segmentation.

Figure 11:
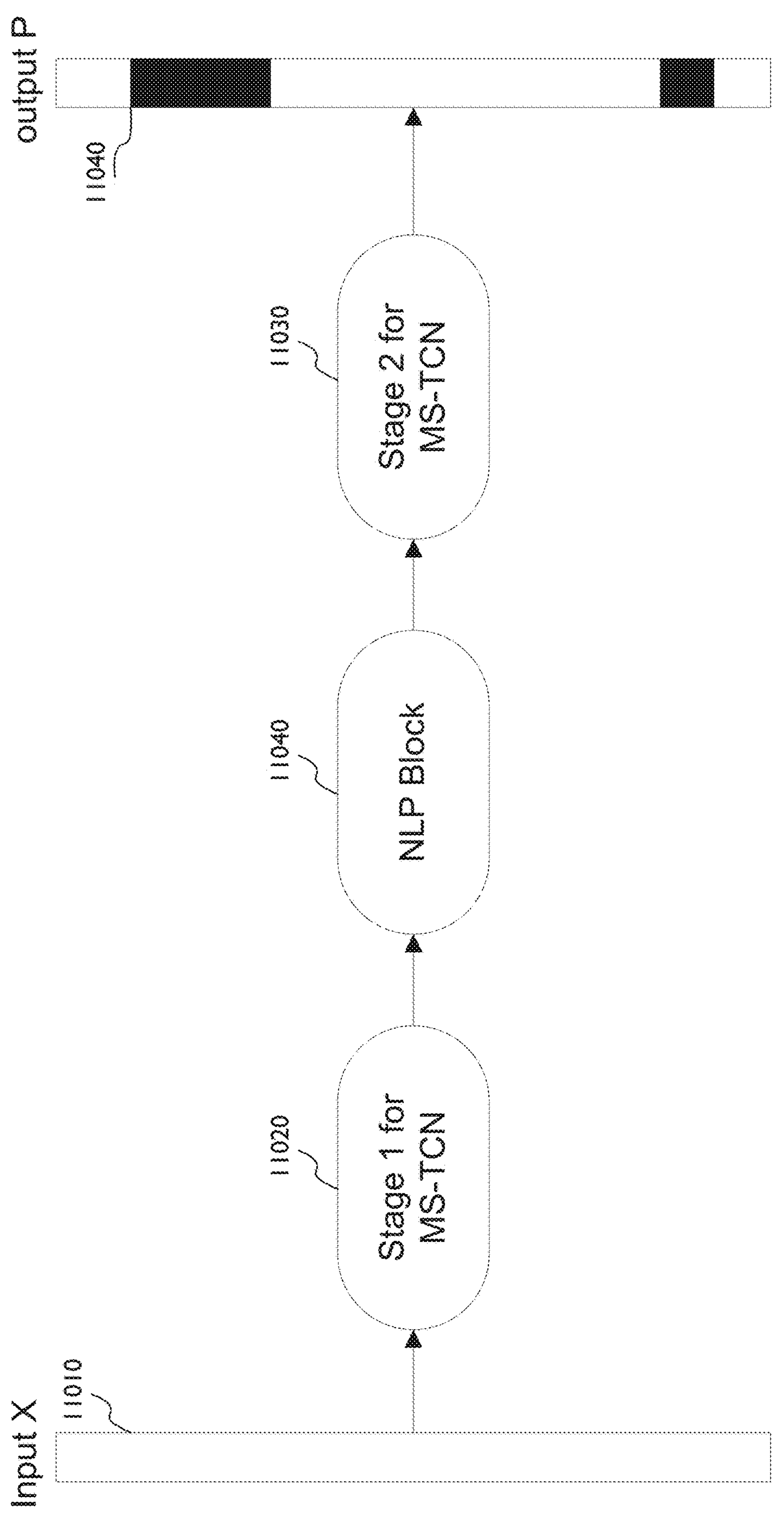
FIG. 11 illustrates an example two stage-temporal convolutional network with natural language processing techniques inserted.

For example, the computing system may apply NLP techniques during segmentation. The computing system may use a BERT network, for example, between a two stage-TCN (e.g., used for segmentation). FIG. 11 illustrates an example two stage-TCN with NLP techniques. As shown in FIG. 11, an input X 11010 and may be used in the two stage-TCN. The input X 11010 may be a representation summary. The two stage-TCN may include a first stage for MS-TCN 11020 and a second stage for MS-TCN 11030. NLP techniques may be used, for example, between the first stage for MS-TCN 11020 and the second stage for MS-TCN 11030 (e.g., as shown at 11040 in FIG. 11). The NLP techniques may include using a BERT in between the first stage and second stage for MS-TCN. As shown in FIG. 11, the output of the first stage for MS-TCN may be the input for the NLP techniques (e.g., BERT). The output of the performed NLP techniques (e.g., BERT), may be the input for the second stage for MS-TCN.

Figure 12:
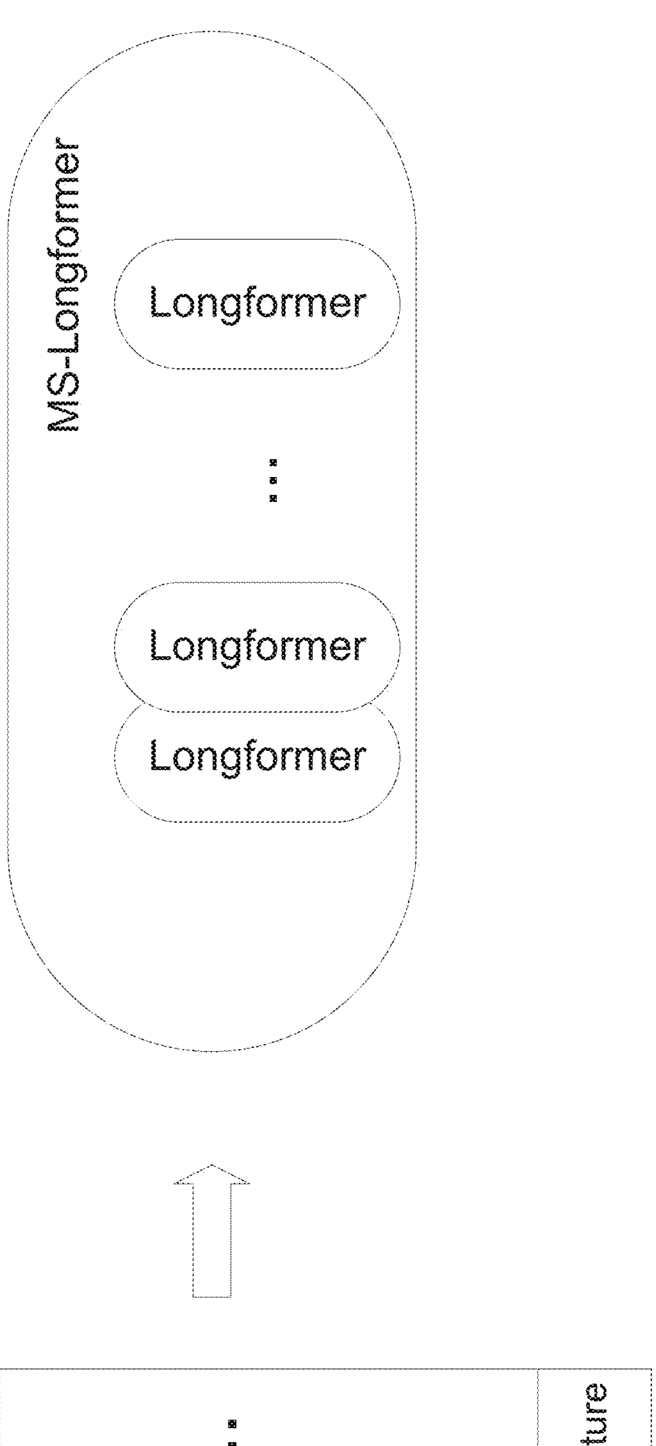
FIG. 12 illustrates an example action segmentation network using transformers.

For example, the computing system may use a fully transformer network for the action segmentation network. FIG. 12 illustrates an example action segmentation network using transformers. The transformer may process time-series data like the TCN. The self-attention operation, which may scale quadratically with the sequence length, may limit the transformer from processing long sequences. A longformer may combine the local windowed attention and the task motivated global attention together, for example, to replace self-attention. The combined local windowed attention and task motivation global attention may reduce memory usage in the longformer. Reducing memory usage in the longformer may improve long sequence processing. Using the longformer may enable processing time-series data for a sequence length (e.g., a sequence length of 4096). For example, if a part of the sequence (e.g., a token) represents one second of the surgical video feature, the longformer may process 4096 seconds of video in one pass. The computing system may process each part separately with the longformer, for example, and combine the processed results for the full surgical video.

In examples, TCN in the MS-TCN may be replaced with a longformer, for example, to form a multi-stage longformer (MS-Longformer). The MS-Longformer may be used as a fully transformer action segmentation network. A local sliding window attention may be used in the MS-Longformer, for example, if dilated attention is not implemented with the longformer. The computing system may refrain from using global attention inside the MS-Longformer, for example, based on the use of multiple stages of the longformer and limited resources (e.g., limited GPU memory resources).

Figure 13:
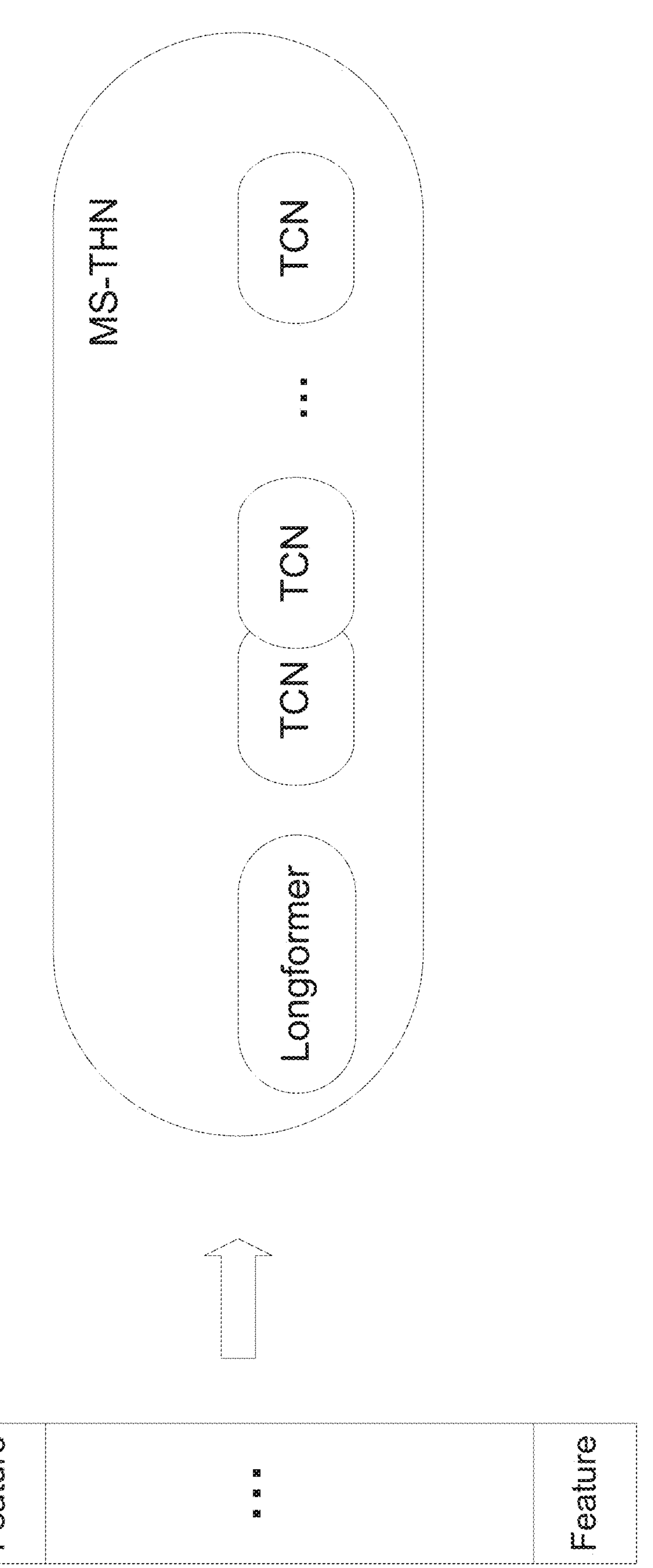
FIG. 13 illustrates an example action segmentation network using a hybrid network.

For example, the computing system may use a hybrid network for the action segmentation network. FIG. 13 illustrates an example action segmentation network using a hybrid network. The hybrid network may use a longformer as a transformer together with an MS-TCN. For a four stage-TCN, the longformer block may be used before the four stage-TCN, after the first stage of TCN, after the second stage of TCN, or after the four stage-TCN. The combination of the transformer and MS-TCN may be referred to as a multi-stage temporal hybrid network (MS-THN). The computing system may use a longformer(s) before the MS-THN. The computing system may use a (e.g., one) longformer block (e.g., one longformer block) before the MS-THN, for example, to utilize global attention (e.g., using limited resources, such as GPU memory resources).

For example, the computing system may apply NLP techniques between segmentation and filtering. The computing system may use a transformer (e.g., between segmentation and filtering), for example, where the input to the transformer may be the segmentation summary. The computing system may generate an output (e.g., using the transformer), where the output may be the NLP decoded segmentation summary. The NLP decoded segmentation summary may be the input for filtering.

In examples, NLP techniques may replace components within the workflow recognition pipeline. The computing system may use NLP techniques (e.g., additionally and/or alternatively) in the pipeline for surgical workflow recognition. For example, NLP techniques may replace a representation extraction model (e.g., as described herein with respect to the computer vision-based recognition architecture). NLP techniques may be used to perform representation extraction, for example, instead of using a 3D CNN or a CNN-RNN design. NLP techniques may be used to perform representation extraction, for example, using TimeSformer. For example, NLP techniques may be used to perform segmentation. NLP techniques may replace the TCN performed inside MS-TCN, for example, to build an MS-Transformer model. For example, NLP techniques may replace a filtering block (e.g., as described herein with respect to the computer vision-based recognition architecture). NLP techniques may be used to refine prediction results from the performed segmentation, for example. NLP techniques may replace any combination of the representation extraction model, segmentation model, and filtering block. For example, a (e.g., single) NLP techniques block may be used to build an end-to-end transformer model (e.g., for surgical workflow recognition). The (e.g., single) NLP techniques block may be used to replace IP-CSN (e.g., or other CNNs), MS-TCN, and PKNF.

The computing system may use NLP techniques in workflow recognition for surgical procedures. For example, the computing system may use NLP techniques in workflow recognitions for robotic and laparoscopic surgical videos, such as gastric bypass procedures. Gastric bypass may be an invasive procedure, for example, performed to trigger weight loss in individuals with a body mass index (BMI) of 35 or greater or with obesity-related comorbidities. Gastric bypass may reduce the intake of nutrients by the body and may reduce BMI. The gastric bypass procedure may be performed in surgical steps and/or phases. The gastric bypass procedure may include surgical steps and/or phases, such as, for example, an exploration/inspection phase, a gastric pouch creation phase, a reinforce gastric pouch staple line phase, a division of omentum phase, a measurement of bowel phase, a gastrojejunostomy phase, a jujunal division phase, a jujunostomy phase, a closure of mesentery phase, a hiatal defect closure phase, and/or the like. A surgical video associated with a gastric bypass procedure may include segments relating to the gastric bypass procedure phases. Video segments relative to surgical phase transition segments, undefined surgical phase segments, out-of-body segments, and/or the like may be assigned a common label (e.g., not a phase label).

For example, the computing system may receive the video for the gastric bypass procedure. The computing system may annotate the surgical video, for example by assigning labels to video segments within the surgical video. The surgical video may have a framerate of 30 frames per second. The computing system may train the deep learning model described herein (e.g., that uses NLP techniques). For example, the computing system may train the deep learning workflow by splitting the dataset randomly. Many videos may be used for a training dataset. For example, 225 videos may be used for the training dataset, 52 videos may be used for the validation dataset, and 60 videos may be used for the testing dataset. Table 1 illustrates minutes of surgical phases in example training, validation, and test datasets. For example, limited data may be available for certain surgical phases. As shown in Table 1, limited data may be available for the exploration/inspection phase, the jujunal division phase, and/or the hiatal defect closure phase. Imbalanced data may be the result of different operation time associated with the different surgical phases. Imbalanced data may be the result of different surgical phases being optional for a surgical procedure.

TABLE 1

The minutes of surgical phases in the training, validation, and test datasets

| Phase Name | Training Data | Validation Data | Testing Data |
|---|---|---|---|
| Not a phase | 7140.72 | 1528.30 | 1949.49 |
| Exploration/Inspection Phase | 13.82 | 3.65 | 2.90 |
| Gastric Pouch Creation Phase | 3662.55 | 1024.00 | 868.17 |
| Reinforce Gastric Pouch Staple Line Phase | 366.98 | 97.27 | 101.82 |
| Division of Omentum Phase | 294.13 | 55.40 | 67.38 |
| Measurement of Bowel Phase | 485.23 | 130.33 | 112.57 |
| Gastrojejunostomy Phase | 4546.70 | 1132.63 | 1220.97 |
| Jejunal Division Phase | 186.92 | 43.92 | 50.28 |
| Jejunostomy Phase | 2405.57 | 603.38 | 638.53 |
| Closure of Mesentery Phase | 1660.52 | 370.32 | 368.73 |
| Hiatal Defect Closure Phase | 240.23 | 71.90 | 39.00 |

In examples, the computing system may use NLP techniques to train an AI model and/or a neural network for workflow recognition in a surgical procedure. The computing system may obtain a set of surgical images and/or frames from a database (e.g., a database of surgical videos). The computing system may apply one or more transformations to each surgical image and/or frame in the set. The one or more transformations may include mirroring, rotating, smoothing, contrast reduction, and/or the like. The computing system may generate a modified set of surgical images and/or frames, for example, based on the one or more transformations. The computing system may create a training set. The training set may include the set of surgical images and/or frames, the modified set of surgical images and/or frames, a set of non-surgical images and/or frames, and/or the like. The computing system may train an AI model and/or neural network, for example, using the training set. After the initial training, the model AI and/or neural network may incorrectly tag non-surgical frames and/or images to be surgical frames and/or images. The model AI and/or neural network may be refined and/or further trained for example, to increase workflow recognition accuracy for the surgical images and/or frames.

In examples, the computing system may refine an AI model and/or neural network for workflow recognition in a surgical procedure, for example, using an additional training set. For example, the computing system may generate an additional training set. The additional training set may include the set of non-surgical images and/or frames that were incorrectly detected as surgical images after the first stage of training and the training set used to initially train the AI model and/or neural network. The computing system may refine and/or further train the model AI and/or neural network in a second stage, for example, using the second training set. The model AI and/or neural network may correspond with increased workflow recognition accuracy, for example, after the second stage of training.

In examples, the computing system may train an AI model and apply the trained AI model to video data using NLP techniques. For example, the AI model may be a segmentation model. The segmentation model may use a transformer, for example. The computing system may receive one or more training datasets, for example, of annotated video data associated with one or more surgical procedures. The computing system may use the one or more training datasets to train a segmentation model, for example. The computing system may train the segmentation AI model, for example, on one or more training datasets of annotated video data associated with one or more surgical procedures. The computing system may receive a surgical video of a surgical procedure, for example, in real-time (e.g., a live surgical procedure) or a recorded surgical procedure (e.g., previously performed surgical procedure). The computing system may extract one or more representation summaries from the surgical video. The computing system may generate a vector representation, for example, corresponding to the one or more representation summaries. The computing system may apply the trained segmentation model (e.g., AI model), for example, to analyze the vector representation. The computing system may apply the trained segmentation model to analyze the vector representation, for example, to identify (e.g., recognize) a predicted grouping of video segments. Each video segment may represent a logical workflow phase of the surgical procedure, for example, such as a surgical phase, a surgical event, a surgical tool usage, and/or the like.

Figure 14:
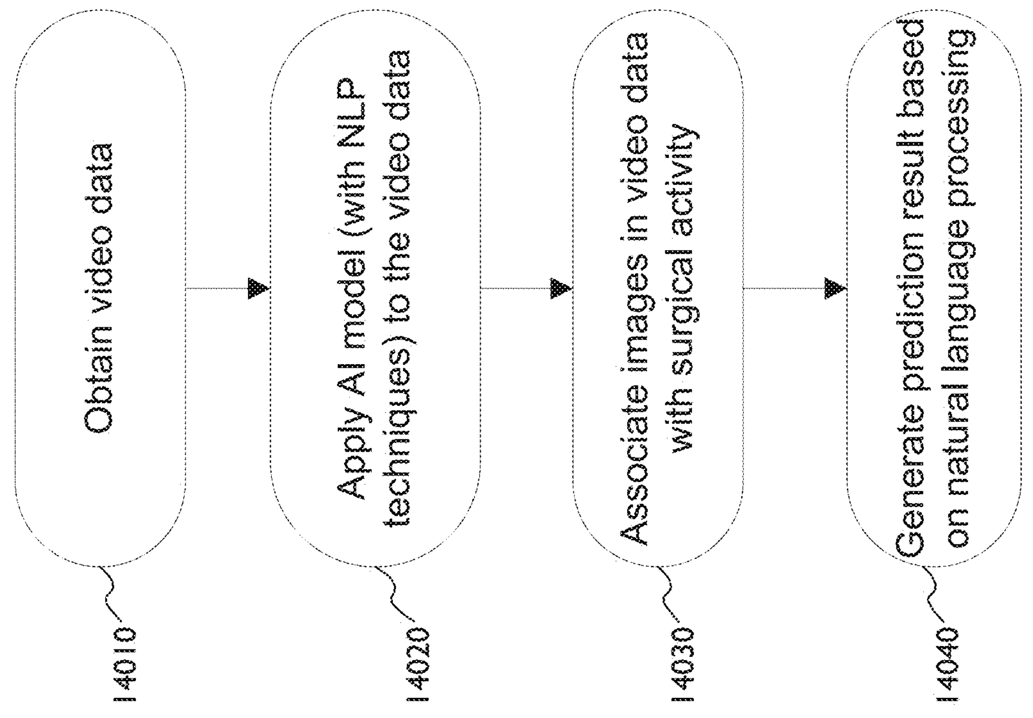
FIG. 14 illustrates an example flow diagram of determining a prediction result for a video.

In examples, a video may be processed using NLP techniques, for example, to determine a prediction result associated with the video. FIG. 14 illustrates an example flow diagram of determining a prediction result for a video. As shown at 14010 in FIG. 14, video data may be obtained. The video data may be associated with a surgical procedure. For example, the video data may be associated with a previously performed surgical procedure or a live surgical procedure. The video data may comprise a plurality of images. As shown at 14020 in FIG. 14, NLP techniques may be performed on the video data. As shown at 14030 in FIG. 14, images from the video data may be associated with surgical activity. As shown at 14040 in FIG. 14, a prediction result may be generated. For example, the prediction result may be generated based on the natural language processing. The prediction result may be a video representation (e.g., predicted video representation) of the input video data.

In examples, the prediction result may include an annotated video. The annotated video may include labels and/or tags attached to the video. The labels and/or tags may include information determined based on the natural language processing. For example, the labels and/or tags may include surgical activity, such as surgical phases, surgical events, surgical tool usage, idle periods, step transitions, surgical phase boundaries, and/or the like. The labels and/or tags may include start times and/or end times associated with the surgical activity. In examples, the prediction result may be metadata attached to the input video. The metadata may include information associated with the video. The metadata may include labels and/or tags.

The prediction result may indicate surgical activity associated with the video data. For example, the prediction result may indicate groups of images and/or video segments to be associated with the same surgical activity in the video data. For example, a surgical video may be associated with a surgical procedure. The surgical procedure may be performed in one or more surgical phases. For example, the prediction result may indicate which surgical phase an image or video segment is associated with. The prediction result may group images and/or video segments classified as the same surgical phase.

In examples, the NLP techniques performed on the video data may be associated with one or more of (e.g., at least one of) the following: extracting a representation summary based on the video data, generating a vector representation based on the extracted representation summary, determining a predicted grouping of video segments based on the generated vector representation, filtering the predicted grouping of video segments, and/or the like. For example, the performed NLP techniques may include extracting a representation summary of the surgical video data using a transformer network. For example, the performed NLP techniques may include extracting a representation summary of the surgical video data using a 3D CNN and a transformer network.

For example, the performed NLP techniques may include extracting a representation summary of the surgical video data using NLP techniques, generating a vector representation based on the extracted representation summary, and determining (e.g., based on the generated vector representation) a predicted grouping of video segments using NLP techniques. For example, the performed NLP techniques may include extracting a representation summary of the surgical video data, generating a vector representation based on the extracted representation summary, determining (e.g., based on the generated vector representation) a predicted grouping of video segments, and filtering the predicted grouping of video segments using natural language processing.

In examples, the video may be associated with a surgical procedure. The surgical video may be received from a surgical device. For example, the surgical video may be received from a surgical computing system, a surgical hub, a surgical surveillance system, a surgical-site camera, and/or the like. The surgical video may be received from a storage, where the storage may contain surgical videos associated with a surgical procedure. The surgical video may be processed using NLP techniques (e.g., as described herein). The surgical activity associated with the images and/or video data (e.g., determined based on performed NLP techniques) may be associated with a respective surgical workflow for a surgical procedure.

NLP may be used, for example, to determine a phase boundary in a surgical video. The phase boundary may be a transition point between surgical activity. For example, a phase boundary may be the point in a video where the determined activity switches. The phase boundary may be the point in a surgical video, for example, where the surgical phases change. The phase boundary may be determined, for example, based on an end time of a first surgical phase and a start time of a second surgical phase occurring after the first surgical phase. The phase boundary may be the images and/or video segments between the end time of the first surgical phase and the start time of the second surgical phase.

NLP may be used, for example, to determine an idle period in the video. The idle period may be associated with inactivity during the surgical procedure. An idle period may be associated with a lack of surgical activity in the video. An idle period may occur in a surgical procedure, for example, based on delays in the surgical procedure. An idle period may occur during a surgical phase in a surgical procedure. The idle period may be determined to occur between two groups of video segments associated with the similar surgical activity, for example. It may be determined that the two groups of video segments associated with the same similar surgical activity are the same surgical phase (e.g., instead of two instances of the same surgical phase, such as performing the same surgical phase twice). For example, the surgical activity occurring before the idle period may be compared to the surgical activity occurring after the idle period. The prediction result may be refined, for example, based on the determined idle periods. For example, the refined prediction result may indicate that the idle period is associated with the surgical phases occurring before and after the idle period.

The idle period may be associated with a step transition. For example, the step transition may be the period of time between surgical phases. The step transition may include the period of time associated with setting up for a subsequent surgical phase, where the surgical activity may be idle. The step transition may be determined, for example, based on an idle period occurring between two different surgical phases.

A surgical recommendation may be generated, for example, based on the identified idle period. For example, the surgical recommendation may indicate areas in the surgical video that may be improved (e.g., with respect to efficiency). The surgical recommendation may indicate an idle period that can be prevented in future surgical procedures. For example, if the idle period is associated with a surgical tool breaking during a surgical phase such that the replacement of the surgical tool causes a delay, the surgical recommendation may indicate a suggestion to prepare backup surgical tools for the surgical phase.

In examples, NLP techniques may be used to detect a surgical tool used in the surgical video. The surgical tool usage may be associated with images and/or video segments. The prediction result may indicate a start time and/or end time associated with the surgical tool usage. The surgical tool usage may be used, for example, to determine surgical activity, such as a surgical phase. For example, a surgical phase may be associated with a group of images and/or video segments because a surgical tool associated with the surgical phase is detected within the group of images and/or video segments. The prediction result may be determined and/or generated, for example, based on the detected surgical tool.

In examples, NLP techniques may be performed using a neural network. For example, NLP techniques may be performed using a CNN, a transformer network, and/or a hybrid network. The CNN may include one or more of the following a 3D CNN, a CNN-RNN, an MS-TCN, a 2D CNN, and/or the like. The transformer network may include one or more of the following: a universal transformer network, a BERT network, a longformer network, and/or the like. The hybrid network may include a neural network with any combination of the CNN or transformer networks (e.g., as described herein). In examples, NLP techniques may be associated with spatio-temporal modeling. The spatio-temporal modeling may be associated with a vision transformer (ViT) with BERT (ViT-BERT) network, a TimeSformer network, a R(2+1)D network, a R(2+1)D-BERT network, a 3DConvNet network, and/or the like.

In examples, a computing system may be used for video analysis and surgical workflow phase recognition. The computing system may include a processor. The computing system may include a memory storing instructions. The processor may perform extraction. The processor may be configured to extract one or more representation summaries. The processor may extract one or more representation summaries, for example, from one or more datasets of video data. The video data may be associated with one or more surgical procedures. The processor may be configured to generate a vector representation, for example, corresponding to the one or more representation summaries. The processor may perform segmentation. The processor may be configured to analyze the vector representation, for example, so as to recognize a predicted grouping of video segments. Each video segment may represent a logical workflow phase of the one or more surgical procedures. The processor may perform filtering. The processor may be configured to apply a filter to the predicted grouping of video segments. The filter may be a noise filter. The processor may be configured to use NLP techniques, for example, with one or more of (e.g., at least one of) extraction, segmentation, or filtering. In examples, the computing system performs at least one of extraction, segmentation, or filtering using a transformer network.

For example, the computing system may perform extraction. The computing system may perform extraction using NLP techniques. The computing system may perform extraction with a CNN (e.g., as described herein). The computing system may perform extraction with a transformer network (e.g., as described herein). The computing system may perform extraction with a hybrid network (e.g., as described herein). For example, the computing system may use spatio-temporal learning in association with extraction.

For example, extraction may include performing frame-by-frame and/or segment-by-segment analysis. The computing system may perform frame-by-frame and/or segment-by-segment analysis of the one or more datasets of video data associated with the surgical procedures. For example, extraction may include applying a time-series model. The computing system may apply a time-series model, for example, to the one or more datasets of video data associated with the surgical procedures. For example, extraction may include extracting representation summaries, for example, based on the frame-by-frame and/or segment-by-segment analysis. For example, extraction may include, generating a vector representation, for example, by concatenating the representation summaries.

For example, the computing system may perform segmentation. The computing system may perform segmentation using NLP techniques. The computing system may perform segmentation with a CNN (e.g., as described herein). The computing system may perform segmentation with a transformer network (e.g., as described herein). The computing system may perform segmentation with a hybrid network (e.g., as described herein). For example, the computing system may use spatio-temporal learning in associated with extraction. In examples, the computing system may perform segmentation using an MS-TCN architecture, a long short-term memory (LSTM) architecture, and/or a recurrent neural network.

For example, the computing system may perform filtering. The computing system may perform filtering using NLP techniques. The computing system may perform filtering with a CNN, a transformer network, or a hybrid network (e.g., as described herein). The computing system may perform filtering, for example, using a set of rules. The computing system may perform filtering using a smooth filter. The computing system may perform filtering using prior knowledge noise filtering (PKNF). PKNF may be used based on historical data. The historical data may be associated with one or more of surgical phase order, surgical phase incidence, surgical phase time, and/or the like.

In examples, video data may correspond to a surgical video. The datasets of video data may be associated with a surgical procedure. The surgical procedure may be previously performed or on-going (e.g., live surgical procedure). The computing system may perform extraction and/or segmentation to recognize a predicted grouping of video segments. Each predicted grouping of video segments may represent a logical workflow phase of the surgical procedure. Each logical workflow phase may correspond to a detected event from the vide and/or surgical tool detection in the surgical video.

In examples, the computing system may identify (e.g., automatically identify) phases of a surgical procedure. The computing system may obtain video data. The video data may be surgical video data associated with a surgical procedure. The computing system may perform extraction, for example, on the video data. The computing system may extract representation summaries from the video data associated with the surgical procedure. The computing system may generate a vector representation. The vector representation may correspond to the representation summaries. The computing system may perform segmentation, for example, to analyze the vector representation. The computing system may recognize a predicted grouping of video segments, for example, based on the segmentation. Each video segment may represent a logical workflow of the one or more surgical procedures. The computing system may use NLP techniques. For example, the computing system may use NLP techniques in associated with at least one of extraction or segmentation.

In examples, the computing system may use NLP techniques in association with spatio-temporal analysis. The computing system may use NLP techniques in association with extraction and segmentation. The computing system may use NLP techniques to generate an NLP encoded representation, for example, based on data output from extraction. The computing system may perform segmentation on the NLP encoded representation. The computing system may use NLP techniques to generate an NLP decoded summary, for example, of the predicted grouping of video segments. The computing system may use NLP techniques to generate an NLP decoded summary of the predicted grouping of video segments, for example, based on data output from segmentation. The computing system may perform filtering on the NLP decoded summary of the predicted grouping of video segments.

In examples, the computing system may use NLP techniques during extraction. The computing system may use NLP techniques, for example, to replace extraction. The computing system may use NLP techniques after extraction and before segmentation. For example, the computing system may use NLP techniques to generate the NLP encoded representation summary, for example, based on the data output by extraction. The computing system may use NLP techniques during segmentation. The computing system may use NLP techniques, for example, to replace extraction. The computing system may use NLP techniques after segmentation and before filtering. For example, the computing system may use NLP techniques to generate the decoded NLP decoded summary of the predicted grouping of video segments, for example, based on the data output by the segmentation module.

In examples, the computing system may identify (e.g., automatically identify) phases of a surgical procedure, for example, using NLP techniques. The computing system may use NLP techniques for spatio-temporal analysis. For example, the computing system may obtain one or more datasets of video data. The computing system may use NLP techniques for spatio-temporal analysis on the one or more data sets of video data. The computing system may use NLP techniques to perform extraction (e.g., as described herein). The computing system may use NLP techniques to perform segmentation (e.g., as described herein). The computing system may use NLP techniques as an end-to-end model for identifying phases of a surgical procedure. For example, the end-to-end model may include a (e.g., single) end-to-end transformer-based model.

In examples, the computing system may perform workflow recognition on a surgical video. For example, the computing system may perform extraction using an IP-CSN. The computing system may use the IP-CSN to extract features, for example, that contain spatial information and/or local temporal information. The computing system may extract features on a segment-by-segment basis, for example, using one or more temporal segments of the surgical video. The computing system may use an MS-TCN, for example, to capture global temporal information from the surgical video. The global temporal information may be associated with the whole surgical video. The computing system may train the MS-TCN, for example, using the extracted features. The computing system may perform filtering, for example, using PKNF. The computing system may perform filtering using PKNF, for example, to filter noise. The computing system may filter noise from the output of the MS-TCN.

Surgical Triplet Recognition

Figure 15:
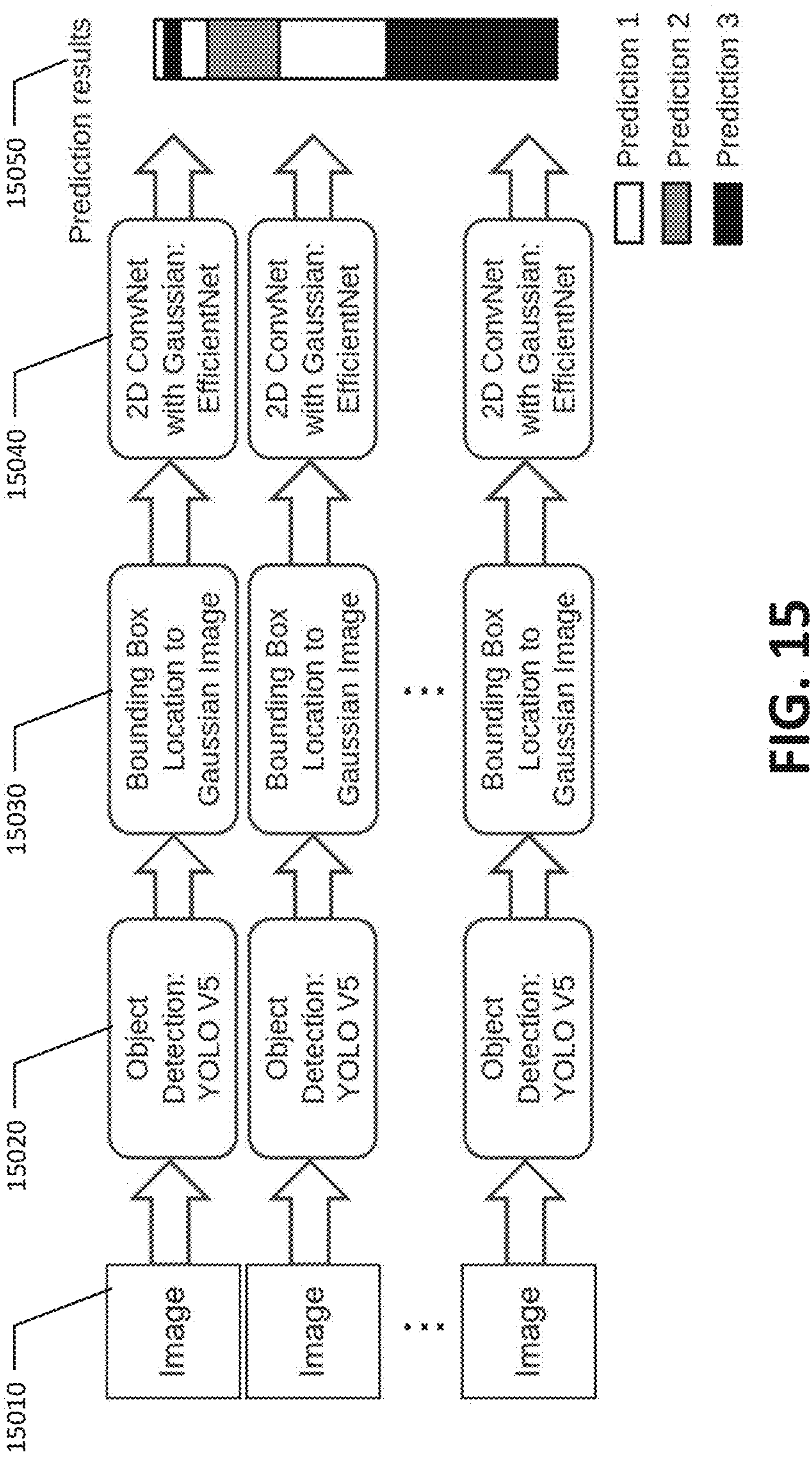
FIG. 15 illustrates an example computer vision-based workflow, event, and triplet recognition.
Figure 16:
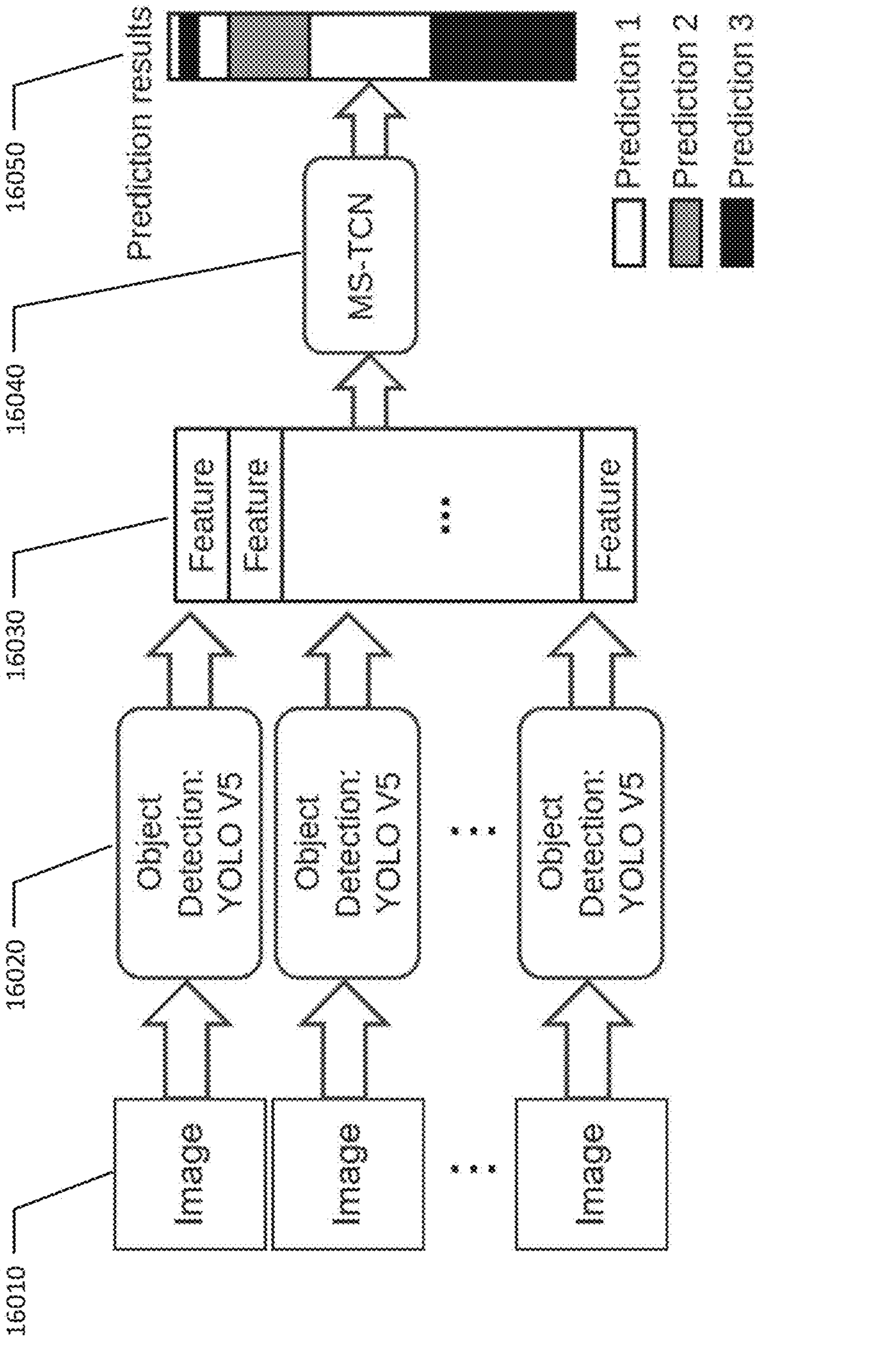
FIG. 16 illustrates an example computer vision-based workflow, event, and triplet recognition.
Figure 17:
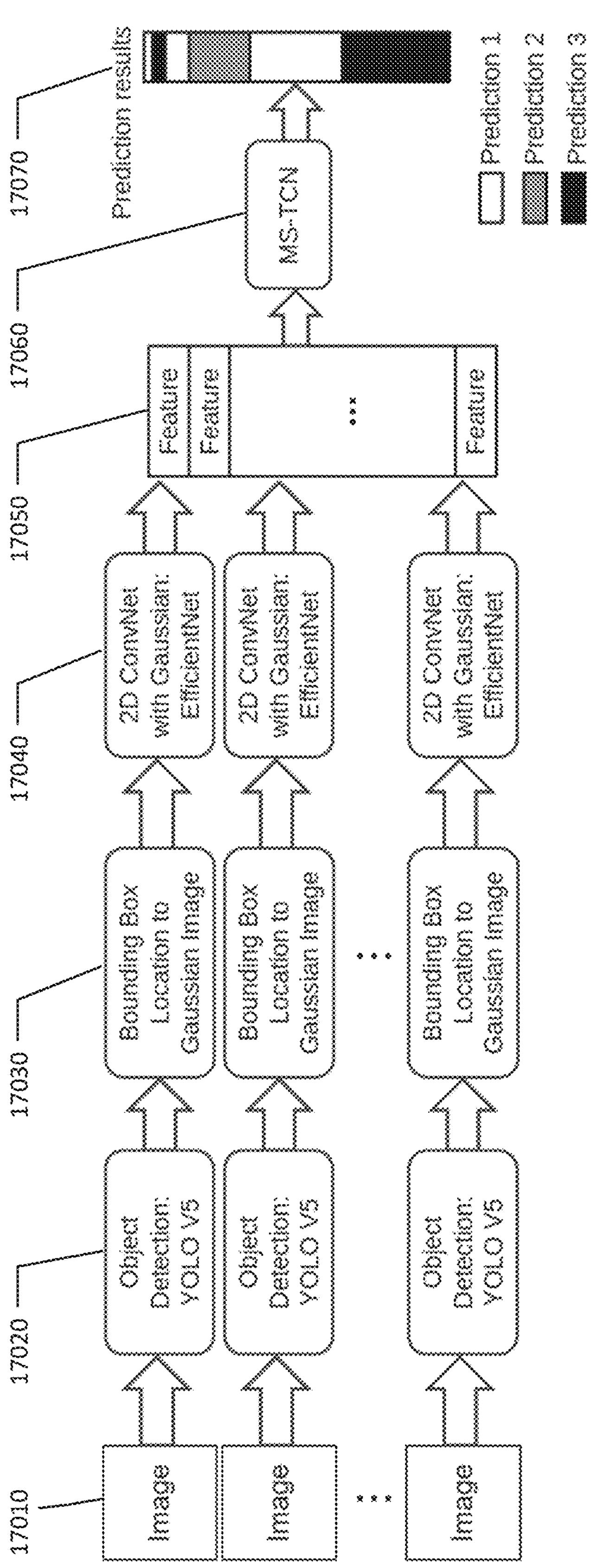
FIG. 17 illustrates an example computer vision-based workflow, event, and triplet recognition.

While the above machine learning architecture (including the 2D CNN and MS-TCN) can also be applied to detect surgical actions involving instruments and target tissue, FIGS. 15-17 are directed to an implementation where the architectures described herein are used for surgical action triplet recognition. In some instances, in addition to or as an alternate to the recognition of phases, stages, or single verbs, it may be desirable to analyze surgical workflow activities to recognize surgical actions as a triplet of instrument, verb, and anatomical target. The surgical action triplet represents activity of the surgical tool.

In this regard, deep learning algorithms may be used to recognize action triplets directly from frames inside surgical videos (e.g., of laparoscopic or open surgery video data). An attention module (e.g., object detection module) may introduce local attention to the tool location by generating a Gaussian point centered on the tool location. Features may be extracted based on the tool location. Based on the extracted features, a prediction module can recognize a combination of: a surgical action, a surgical tool, and/or a target tissue. In some examples, EfficientNet-MS-TCN (or another MS-TCN (multi-stage temporal convolutional network)), Gaussians attention 2D ConvNet (or other 2D CNN), and YOLO (You Only Look Once) (e.g., YOLOv5) may be used in combination to perform surgical triplet recognition on a dataset.

FIG. 15 illustrates an exemplary architecture including a combination of YOLOv5 and Gaussians attention 2D ConvNet. Image data 15010, such as frames of one or more surgical videos, are input into an attention module. The attention module may be implemented as YOLOv5 15020, which may be used as the object detection network to locate bounding boxes of surgical action triplets as areas of interest. The bounding box identification may be used to generate a Gaussian image in module 15030, e.g, one or more Gaussian maps with the one or more bounding boxes. The Gaussian attention 2D ConvNet 15040 may then be used in a prediction 15050 of a surgical action, where the predicted surgical action is modeled as an action triplet representing activity of the surgical tool. In some implementations, ResNet, EfficientNet, or other 2D ConvNets could be used in place of, or in addition to Gaussian attention 2D ConvNet 15040.

FIG. 16 illustrates an exemplary architecture including a combination of YOLOv5 and MSTCN. Image data 16010, such as frames of one or more surgical videos, are input into an attention module. The attention module may be implemented as YOLOv5 16020, which may be trained as an object detection network to locate bounding boxes of Surgical Action Triplets, the bounding boxes indicating areas of interest. YOLOv5 16020 may be used in a feature extraction network to extract features for each frame of a surgical video to capture spatial information. The extracted features may be concatenated 16030 to obtain features regarding the full video. An MS-TCN 16040 may then be used to capture temporal information to achieve a prediction 16050. The prediction 16050 may be understood as the recognition of the surgical action triplet representing activity of the surgical tool.

FIG. 17 illustrates an exemplary architecture including a combination of YOLOv5, Gaussians attention 2D ConvNet, and MSTCN. Image data 17010, such as frames of one or more surgical videos, are input into an attention module. The attention module may be implemented as YOLOv5 17020, which may be trained as an object detection network to locate bounding boxes of Surgical Action Triplets, the bounding boxes indicating areas of interest. The Gaussian attention 2D ConvNet may be used subsequently to build Gaussian maps with the bounded boxes located by YOLOv5 17020. The Gaussian attention 2D ConvNet 17040 may be used as a feature extraction network to extract features for each frame of a surgical video to capture spatial information. In some implementations, ResNet, EfficientNet, or other 2D ConvNets could be used in place of, or in addition to Gaussian attention 2D ConvNet 17040. The extracted features may be concatenated 17050 to obtain features regarding the full video. An MS-TCN 17060 may then be used to capture temporal information to achieve a prediction 17070. The prediction 17070 may be understood as the recognition of the surgical action triplet representing activity of the surgical tool.

In some examples, a system may identify surgical actions in a surgical video. The system may comprise: one or more processors, a memory storing (a) instructions and (b) a dataset comprising one or more triplets representing surgical video data, wherein each respective triplet comprises instrument data, verb of surgical action data, and anatomical target data; an object detection module that uses the one or more processors to detect a tool location of a surgical tool in at least one frame of the surgical video data; an attention module that uses the one or more processors to generate an attention map centered on the tool location; and a prediction module that uses the one or more processors to recognize, based on the extracted features, one or more of a (a) a surgical action, (b) a surgical tool, or (c) a target tissue. In some examples, the prediction module may recognize a surgical action and wherein the recognized surgical action is modeled as an action triplet representing activity of the surgical tool. In some examples, the attention module may introduce local attention to the tool location by generating a Gaussian point centered on the tool location. In some examples, the object detection module may comprise a YOLOv5 (You Only Look Once) neural network to locate one or more bounding boxes of triplets representing areas of interest. In some examples, the attention module may generate one or more Gaussian maps with the one or more bounding boxes. In some examples, the prediction module may implement a two-dimensional convolutional neural network (2D CNN). In some examples, the dataset may be a laparoscopic dataset or an open surgery dataset.

In some examples, a system may identify surgical actions in a surgical video. The system may comprise: one or more processors; a memory storing (a) instructions and (b) a dataset comprising one or more triplets representing surgical video data, wherein each respective triplet comprises instrument data, verb data, and anatomical target data; an object detection module that uses the one or more processors to detect a tool location in at least one frame of the surgical video data; a feature extraction module that uses the one or more processors to extract features from the dataset based on the tool location; and a prediction module that uses a multi-stage temporal convolutional network (MS-TCN) to recognize, based on the extracted features, one or more of (a) a surgical action, (b) a surgical tool, or (c) a target tissue.

In some examples, a system may identify surgical actions in a surgical video. The system may comprise: one or more processors; a memory storing (a) instructions and (b) a dataset comprising one or more triplets representing surgical video data, wherein each respective triplet comprises instrument data, verb data, and anatomical target data; an object detection module that uses the one or more processors to (1) detect a tool location in at least one frame of the surgical video data and (2) extract features from the dataset based on the tool location; and a prediction module that uses a multi-stage temporal convolutional network (MS-TCN) to recognize, based on the extracted features, one or more of (a) a surgical action, (b) a surgical tool, or (c) a target tissue.

In some examples, a system may identify surgical actions in a surgical video. The system may comprise: one or more processors; a memory storing (a) instructions and (b) a dataset comprising one or more triplets representing surgical video data, wherein each respective triplet comprises instrument data, verb data, and anatomical target data; an object detection module that uses the one or more processors to detect a tool location in at least one frame of the surgical video data; an attention module that uses the one or more processors to generate an attention map centered on the tool location; a feature extraction module that implements a two-dimensional convolutional neural network (2D CNN) to extract features from the dataset based on the attention map; and a prediction module that uses a multi-stage temporal convolutional network (MS-TCN) to recognize, based on the extracted features, one or more surgical actions.

In some examples, a system may identify surgical actions in a surgical video. The system may comprise: one or more processors; a memory storing (a) instructions and (b) a dataset comprising one or more triplets representing surgical video data, wherein each respective triplet comprises instrument data, verb data, and anatomical target data; an object detection module using a two-dimensional convolutional neural network (2D CNN) as a backbone to generate an attention map on a tool location in at least one frame of the surgical video data; a feature extraction module that implements a two-dimensional convolutional neural network (2D CNN) to extract features from the dataset based on the attention map; and a prediction module that uses a multi-stage temporal convolutional network (MS-TCN) to recognize, based on the extracted features, one or more surgical actions.

In some examples, a system may recognize tool-tissue interactions in surgical videos. The system may comprise: one or more processors; a memory storing surgical video data; a YOLOv5 (You Only Look Once) neural network to locate one or more bounding boxes of triplets representing areas of interest in the surgical video data; a Gaussian attention two-dimensional convolutional neural network that extracts features associated with the surgical video data based on the one or more bounding boxes; and a multi-stage temporal convolutional network (MS-TCN) to recognize, based on the extracted features, one or more tool-tissue interactions.

In some examples, surgical actions may be identified in a surgical video. A dataset may be obtained of surgical video data. A tool location of a surgical tool may be detected in at least one frame of the surgical video data. An attention map overlaid on the tool location may be obtained. Features may be extracted from the dataset based on the attention map. One or more surgical actions may be recognized based on the extracted features. In some examples, the attention map may be a Gaussian attention map.

Although the computing system may perform video analysis and/or workflow recognition using NLP techniques in the surgical context (e.g., as described herein), the video analysis and/or workflow recognition is not limited to surgical videos. Video analysis and/or workflow recognition using NLP techniques (e.g., as described herein) may be applied to other video data unrelated to surgical context).

What is claimed is:

1. A system for identifying surgical actions in a surgical video, the system comprising:

one or more processors;

a memory storing (a) instructions and (b) a dataset comprising one or more triplets representing surgical video data, wherein each respective triplet comprises instrument data, verb data, and anatomical target data;

an object detection module that uses the one or more processors to detect a tool location in at least one frame of the surgical video data;

an attention module that uses the one or more processors to generate an attention map centered on the tool location wherein the attention module introduces local attention to the tool location by generating a Gaussian point centered on the tool location;

a feature extraction module that implements a two-dimensional convolutional neural network (2D CNN) to extract features from the dataset based on the attention map; and a prediction module that uses a multi-stage temporal convolutional network (MS-TCN) to recognize, based on the extracted features, one or more surgical actions.

2. The system of claim 1, wherein the prediction module recognizes a surgical action and wherein the recognized surgical action is modeled as an action triplet representing activity of the surgical tool.

3. The system of claim 1, wherein the object detection module comprises a YOLOv5 (You Only Look Once) neural network to locate one or more bounding boxes of triplets representing areas of interest.

4. The system of claim 3, wherein the attention module generates one or more Gaussian maps with the one or more bounding boxes.

5. The system of claim 1, wherein the dataset is a laparoscopic dataset or an open surgery dataset.

6. A method for identifying surgical actions in a surgical video, the method comprising:

obtaining a dataset of surgical video data;

detecting a tool location of a surgical tool in at least one frame of the surgical video data;

obtaining an attention map overlaid on the tool location;

locating one or more bounding boxes of triplets representing areas of interest using a YOLOv5 (You Only Look Once) neural network;

extracting features from the dataset based on the attention map; and recognizing, based on the extracted features, one or more surgical actions.

7. The method of claim 6, wherein the attention map is a Gaussian attention map.

8. The method of claim 6, wherein the dataset of surgical video data comprises one or more triplets representing surgical video data.

9. The method of claim 8, wherein each respective triplet comprises instrument data, verb data, and anatomical target data.

10. The method of claim 6, wherein the attention map overlaid on the tool location is centered on the tool location.

11. The method of claim 6, wherein a recognized surgical action from the one or more surgical actions is modeled as an action triplet representing activity of the surgical tool.

12. The method of claim 6, wherein the method further comprises introducing local attention to the tool location by generating a Gaussian point centered on the tool location.

13. The method of claim 6, wherein the method further comprises generating one or more Gaussian maps with the one or more bounding boxes.

14. The method of claim 6, wherein the one or more surgical actions recognized based on the extracted features is recognized using a multi-stage temporal convolutional network (MS-TCN).

15. The method of claim 6, wherein the method further comprises:

recognizing, based on the extracted features and using a multi-stage temporal convolutional network (MS-TCN), one or more tool-tissue interactions.

16. The method of claim 6, wherein the dataset is a laparoscopic dataset or an open surgery dataset.

17. A system for identifying surgical actions in a surgical video, the system comprising:

one or more processors;

a memory storing surgical video data;

an object detection module that uses the one or more processors to detect a tool location in at least one frame of the surgical video data, wherein the object detection module comprises a YOLOv5 (You Only Look Once) neural network to locate one or more bounding boxes of triplets representing areas of interest in the surgical video data;

a feature extraction module that uses Gaussian attention two-dimensional convolutional neural network to extract features associated with the surgical video data based on the one or more bounding boxes; and a prediction module that uses a multi-stage temporal convolutional network (MS-TCN) to recognize, based on the extracted features, one or more tool-tissue interactions.

18. The system of claim 17, wherein the prediction module recognizes a surgical action and wherein the recognized surgical action is modeled as an action triplet representing activity of a surgical tool.

* * * * *